US010693705B2

(12) United States Patent
Duda

(10) Patent No.: US 10,693,705 B2
(45) Date of Patent: Jun. 23, 2020

(54) SHOW COMMAND SERVICE AKA CLI RELAY

(71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 158 days.

(21) Appl. No.: 15/078,457

(22) Filed: Mar. 23, 2016

(65) Prior Publication Data

US 2017/0279659 A1    Sep. 28, 2017

(51) Int. Cl.
| | | |
|---|---|---|
| *H04L 12/58* | (2006.01) |
| *H04L 29/08* | (2006.01) |
| *G06F 16/9535* | (2019.01) |
| *H04L 12/24* | (2006.01) |
| *A63F 13/86* | (2014.01) |
| *H04N 21/478* | (2011.01) |

(52) U.S. Cl.
CPC ........ *H04L 41/046* (2013.01); *G06F 16/9535* (2019.01); *H04L 41/0816* (2013.01); *H04L 51/18* (2013.01); *H04L 67/32* (2013.01); *A63F 13/86* (2014.09); *H04L 67/16* (2013.01); *H04L 67/20* (2013.01); *H04L 67/26* (2013.01); *H04N 21/4781* (2013.01)

(58) Field of Classification Search
CPC ......... H04L 43/08; H04L 43/12; H04L 43/04; H04L 67/20; H04L 67/26; H04L 67/32; H04L 67/16; H04N 21/4781; A63F 13/86; A63F 13/87
See application file for complete search history.

(56) References Cited

U.S. PATENT DOCUMENTS

| | | |
|---|---|---|
| 7,299,237 B1 | 11/2007 | Clark et al. |
| 7,774,440 B1 | 8/2010 | Bagrodia et al. |
| 8,291,468 B1 | 10/2012 | Chickering |
| 9,235,802 B1 | 1/2016 | Chamness |
| 9,697,172 B1 | 7/2017 | Somohano et al. |
| 10,003,629 B2 | 6/2018 | Pech et al. |
| 10,187,286 B2 | 1/2019 | Sigoure |
| 2004/0015609 A1 | 1/2004 | Brown et al. |
| 2004/0267916 A1 | 12/2004 | Chambliss |
| 2005/0204028 A1 | 9/2005 | Bahl et al. |
| 2006/0041660 A1* | 2/2006 | Bishop .................. H04L 41/065 709/224 |
| 2006/0085507 A1* | 4/2006 | Zhao ...................... G06Q 10/10 709/206 |
| 2009/0228586 A1* | 9/2009 | Claise ................. H04L 43/0817 709/224 |

(Continued)

FOREIGN PATENT DOCUMENTS

| | | |
|---|---|---|
| CN | 1490979 A | 4/2004 |
| CN | 101553797 A | 10/2009 |

*Primary Examiner* — Tom Y Chang
(74) *Attorney, Agent, or Firm* — Chamberlain, Hrdlicka, White, Williams, & Aughtry

(57) ABSTRACT

A method for accessing operational information of a deployed network device through non-preprogrammed command line interface instructions. More specifically, a show command service is disclosed, which enables the procurement of additional configuration and/or state information on a network device through a coordination point.

18 Claims, 16 Drawing Sheets

(56) References Cited

U.S. PATENT DOCUMENTS

| | | |
|---|---|---|
| 2013/0235870 A1 | 9/2013 | Tripathi |
| 2014/0075327 A1 | 3/2014 | Noel |
| 2014/0269319 A1 | 9/2014 | Decusatis |
| 2014/0337467 A1 | 11/2014 | Pech et al. |
| 2015/0092561 A1 | 4/2015 | Sigoure |
| 2015/0100675 A1 | 4/2015 | Davie |
| 2015/0358200 A1 | 12/2015 | Mahajan |
| 2015/0358209 A1 | 12/2015 | Zhang |
| 2016/0057052 A1 | 2/2016 | Zhang et al. |
| 2017/0004221 A1 | 1/2017 | Olsen |

* cited by examiner

```
Example Command Output 540

MLAG Configuration    :
domain-id             :  ar.mg.mlag
local-interface       :  Vlan3901
peer-address          :  172.17.254.2
peer-link             :  Port-Channel1

MLAG Status           :
state                 :  Active
peer-link status      :  Up
local-int status      :  Up
system-id             :  02:1c:73:00:13:19

MLAG Ports            :
Disabled              :  0
Configured            :  0
Inactive              :  0
Active-partial        :  0
Active-full           :  5
```

*FIG. 5C*

```
Example Command Result 542

Filter Expression Result (FER) 544

TRUE
```

SHOW COMMAND SERVICE AKA CLI RELAY

BACKGROUND

Operational information with respect to deployed network devices may be accessed by an inquiring party through pre-programmed command line interface (CLI) instructions. The challenge arises when operational information accessible through non-preprogrammed CLI instructions are sought.

SUMMARY

In general, in one aspect, the invention relates to a method for processing a modified command request (CRQ). The method includes receiving an event notification from a notification issuer, obtaining, in response to the received event notification the modified CRQ from a network device state database, processing the modified CRQ to generate a command response (CMR), making a first determination that the CMR includes a difference, and sharing, based on the first determination, the CMR with a coordination point.

In general, in one aspect, the invention relates to a network device, comprising a computer processor, a relay command executor (RCE), a process scheduler, and a network device state database accessible to a network device show command service (SCS) agent configured to receive an event notification from a notification issuer, obtain, in response to the received event notification the modified CRQ from the network device state database, process the modified CRQ to generate a command response (CMR), make a first determination that the CMR includes a difference, and share, based on the first determination, the CMR with a coordination point.

In general, in one aspect, the invention relates to a non-transitory computer readable medium comprising instructions, which when executed by a processor, perform a method, the method comprising receiving an event notification from a notification issuer, obtaining, in response to the received event notification the modified CRQ from the network device state database, processing the modified CRQ to generate a command response (CMR), making a first determination that the CMR includes a difference, and sharing, based on the first determination, the CMR with a coordination point.

In general, in one aspect, the invention relates to a method for processing a standing request on a network device. The method includes receiving, from an external agent, the standing request, processing the standing request to obtain a result, identifying a change in the result, and notifying, based on the identifying, the change in the result.

Other aspects of the invention will be apparent from the following description and the appended claims.

BRIEF DESCRIPTION OF DRAWINGS

FIG. 5C shows an example command output in accordance with one or more embodiments of the invention.

FIG. 5D shows an example command result in accordance with one or more embodiments of the invention.

DETAILED DESCRIPTION

Figure 1A:
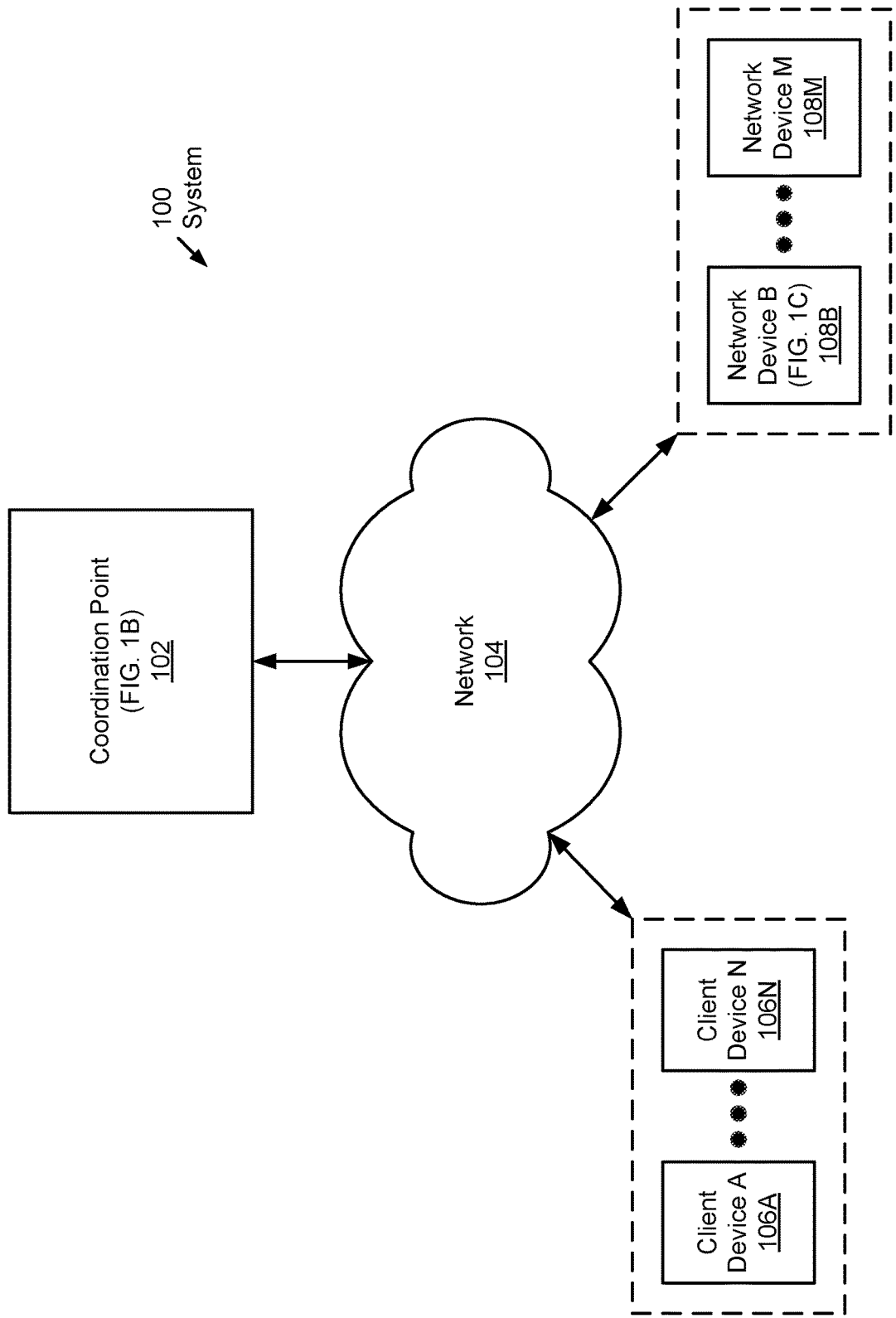
FIG. 1A shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method for accessing operational information of a deployed network device through non-preprogrammed command line interface instructions. More specifically, a show command service is disclosed, which enables the procurement of additional configuration and/or state information on a network device through a coordination point.

FIG. 1A shows a system in accordance with one or more embodiments of the invention. The system (100) includes a coordination point (102) operatively connected to one or more client device(s) (106A, 106N) and one or more network device(s) (108B, 108M) through a network (104). Each of these components is described below.

In one embodiment of the invention, the coordination point (102) is a computing device that manages a set of network devices (e.g., 108B, 108M). In one embodiment of the invention, a computing device is any physical or virtual device that may be used for performing various embodiments of the invention. The physical device may correspond to any physical system (see e.g., FIG. 6) with functionality to implement one or more embodiments of the invention. For example, the physical device may be a server (i.e., a device with at least one or more processor(s), memory, and an operating system) that is directly (or operatively) connected to at least one client device (e.g., 106A, 106N) and at least one network device (e.g., 108B, 108M).

Alternatively, the physical device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, the coordination point (102) may correspond to a virtual machine. Broadly speaking, virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architecture involving: (i) one or more virtual machines executing on a host computer system such that each virtual machine serves as a host to an instance of a guest operating system; and (ii) a hypervisor layer serving to facilitate intra-host communication between the one or more virtual machines and the host computer system hardware. Alternatively, one or more embodiments of the invention may be implemented on Xen® architectures involving: (i) a control host operating system (e.g., Dom 0) including a hypervisor; and (ii) one or more virtual machines (e.g., Dom U) executing guest operating system instances. VMware® is a registered trademark of VMware, Inc. Xen® is a trademark overseen by the Xen Project Advisory Board.

In one embodiment of the invention, the coordination point (102) may be implemented in a virtual machine executing on a network device. In another embodiment of the invention, the coordination point may be implemented in a virtual machine executing on a server that is operatively (or directly) connected to one or more client device(s) (e.g., 106A, 106N in FIG. 1A) and/or one or more network device(s).

In one embodiment of the invention, the coordination point (102) includes executable instructions (stored in a non-transitory computer readable medium (not shown)), which when executed, enable the coordination point to perform the methods described below (see e.g., FIG. 3). Additional detail about the coordination point is described below with respect to FIG. 1B.

In one embodiment of the invention, the one or more client device(s) (106A, 106N) may each be a physical or virtual computing device (discussed above) that is configured to interact with the coordination point (102). For example, a physical client device (see e.g., FIG. 6) may be a desktop computer operated by a network administrator, whereas a virtual client device may be a virtual machine executing on a server. In one embodiment of the invention, a client device includes functionality to: (i) transmit a command request (CRQ) (discussed below) to the coordination point show command service (SCS) agent on the coordination point; and subsequently, (ii) receive a consolidated command response (CCR) (discussed below) from the coordination point SCS agent on the coordination point.

In one embodiment of the invention, the one or more network device(s) (108B, 108M) are physical devices that include persistent storage, memory (e.g., random access memory), one or more processor(s) (including a switch chip), and two or more physical ports. In one embodiment of the invention, the switch chip is hardware that determines which egress port on a network device to forward media access control (MAC) frames. The switch chip may include egress and ingress ports that may connect to ports on the network device. Each port may or may not be connected to another device on a network device on the network (104) (e.g., a server, a switch, a router, etc.). The network device may be configured to receive packets via the ports and determine whether to: (i) drop the packet; (ii) process the packet in accordance with one or more embodiments of the invention; and/or (iii) send the packet, based on the processing, out another port on the network device.

How the network device makes the determination of whether to drop the packet, and/or send the packet to another device on the network depends, in part, on whether the network device is a layer-2 (L2) switch or a layer-3 (L3) switch (also referred to as a multilayer switch), which may perform at least some functions of a router. If the network device is operating as a L2 switch, the network device uses the destination MAC address along with a forwarding table to determine out of which port to send the packet. If the network device is operating as a L3 switch, the network device uses the destination Internet Protocol (IP) address along with a routing table to determine out of which port to send the packet, and includes the ability to write the MAC address of the next device to receive the packet in place of its own MAC address (which the last device to send the packet wrote) in the L2 information encapsulating the packet. If the network device is a multilayer switch, the multilayer switch includes functionality to process packets using both MAC addresses and IP addresses.

Figure 4A:
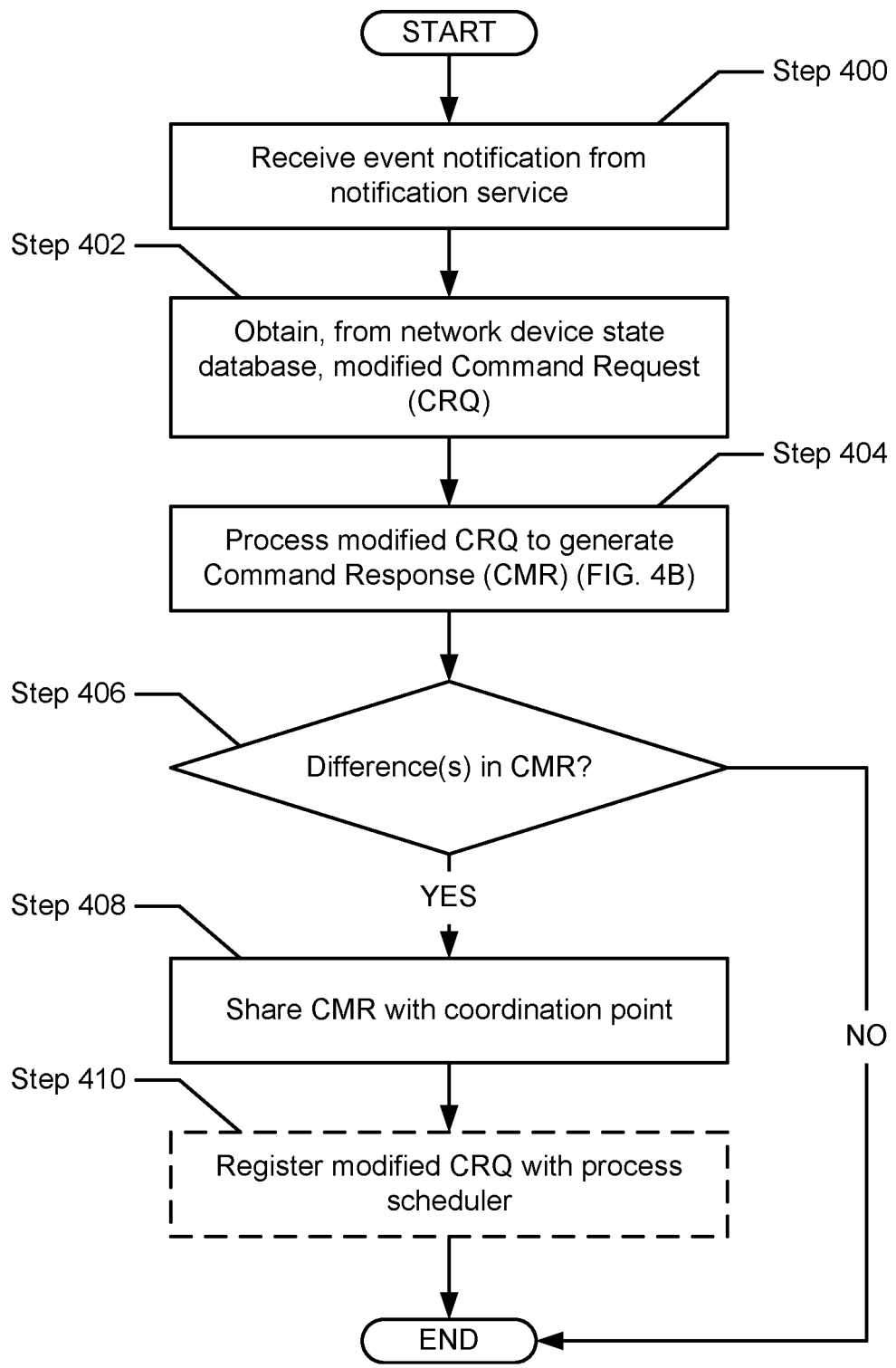
FIG. 4A shows a flowchart that describes a method for processing a modified command request in accordance with one or more embodiments of the invention.
Figure 4B:
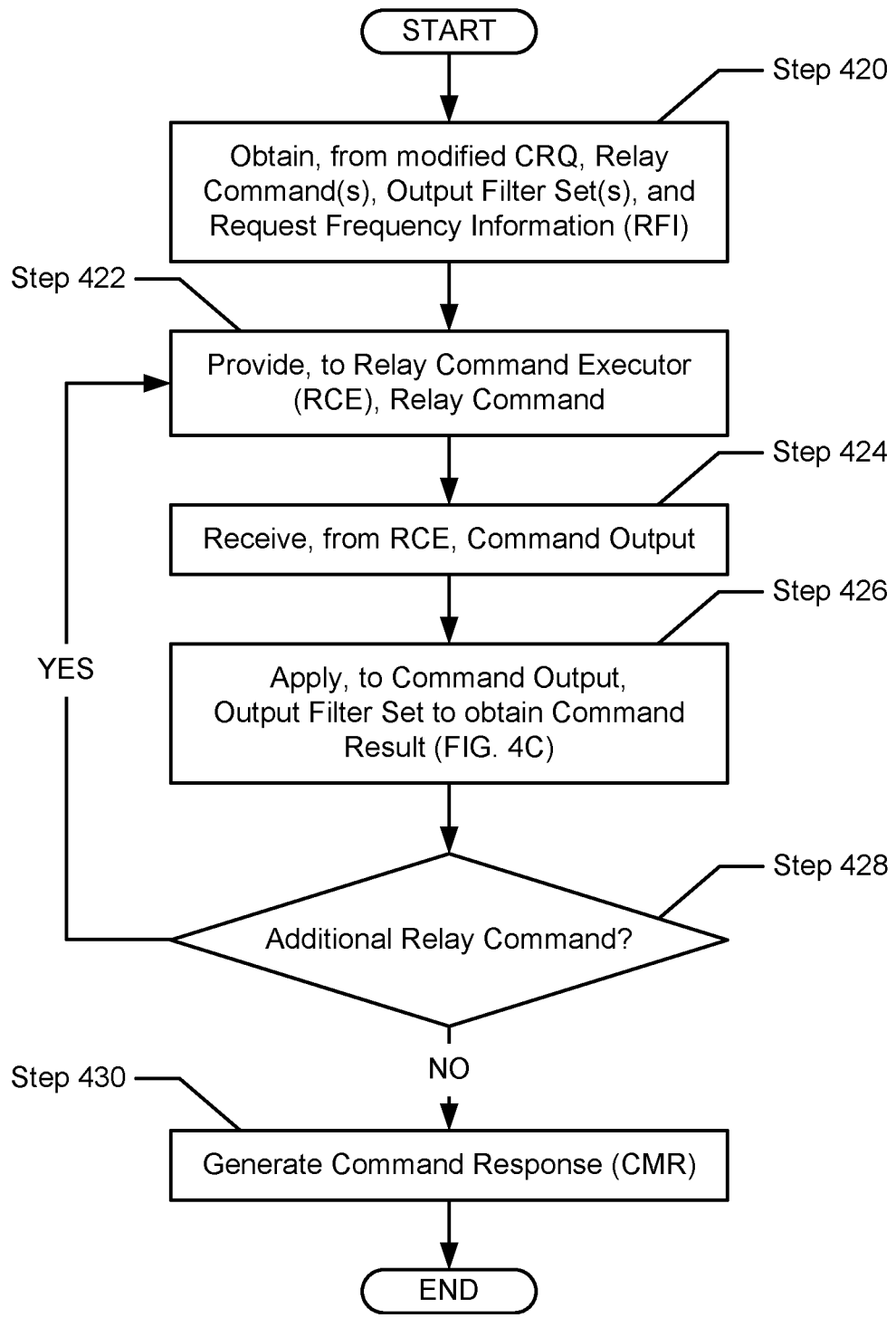
FIG. 4B shows a flowchart that describes a method for generating a command response in accordance with one or more embodiments of the invention.
Figure 4C:
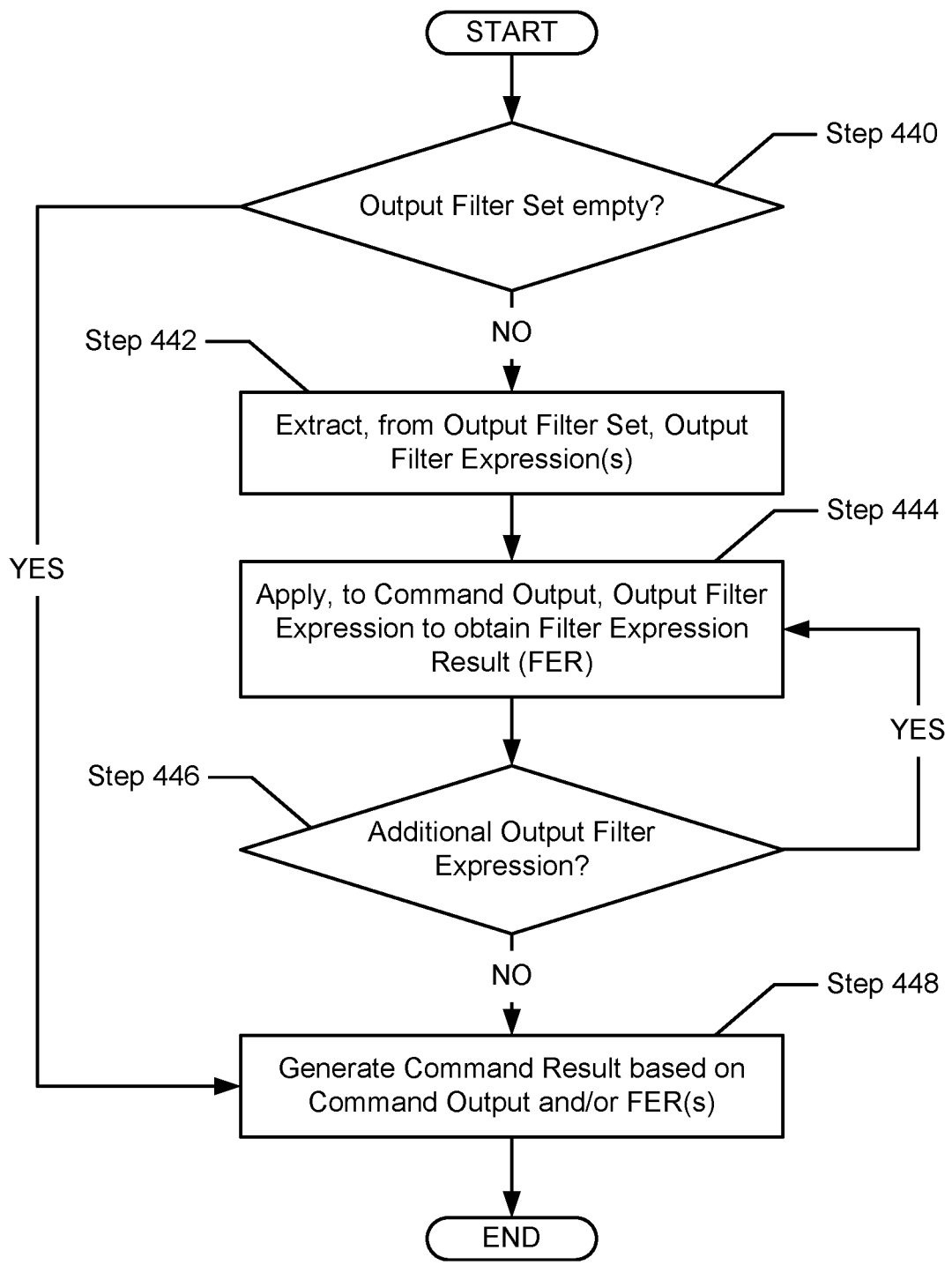
FIG. 4C shows a flowchart that describes a method for generating a command result in accordance with one or more embodiments of the invention.

In one embodiment of the invention, the persistent storage in the network device may include any type of non-transitory computer readable medium that includes instructions, which, when executed by one or more processor(s) in the network device, enable the network device to perform functions described in accordance with one or more embodiments of the invention (see e.g., FIGS. 4A-4C).

Examples of network devices include, but are not limited to, a router, a switch, and a multilayer switch. The network device is not limited to the aforementioned specific examples. Additional detail about a network device is described below with respect to FIG. 1C.

In one embodiment of the invention, the network (104) may be the medium through which the coordination point (102), the one or more client device(s) (106A, 106N), and the one or more network device(s) (108B, 108M) are operatively connected. In one embodiment of the invention, the network may include other network devices (or systems) (not shown) that facilitate communication between the aforementioned components. As such, in one embodiment of the invention, the network may include any combination of local and/or wide area (e.g., Internet) network segments that may be wire-based and/or wireless and that may use any combination of wired and/or wireless communication protocols.

The invention is not limited to the system shown in FIG. 1A. More specifically, while the system shown in FIG. 1A includes a single coordination point, embodiments of the invention may be implemented using multiple coordination points, where the multiple coordination points are configured such that if one of the multiple coordination points fails, the other coordination points may continue to operate and provide the functionality described below (see e.g., FIG. 3) to the client entities (e.g., client devices or client processes (described below)) and the network devices.

Figure 1B:
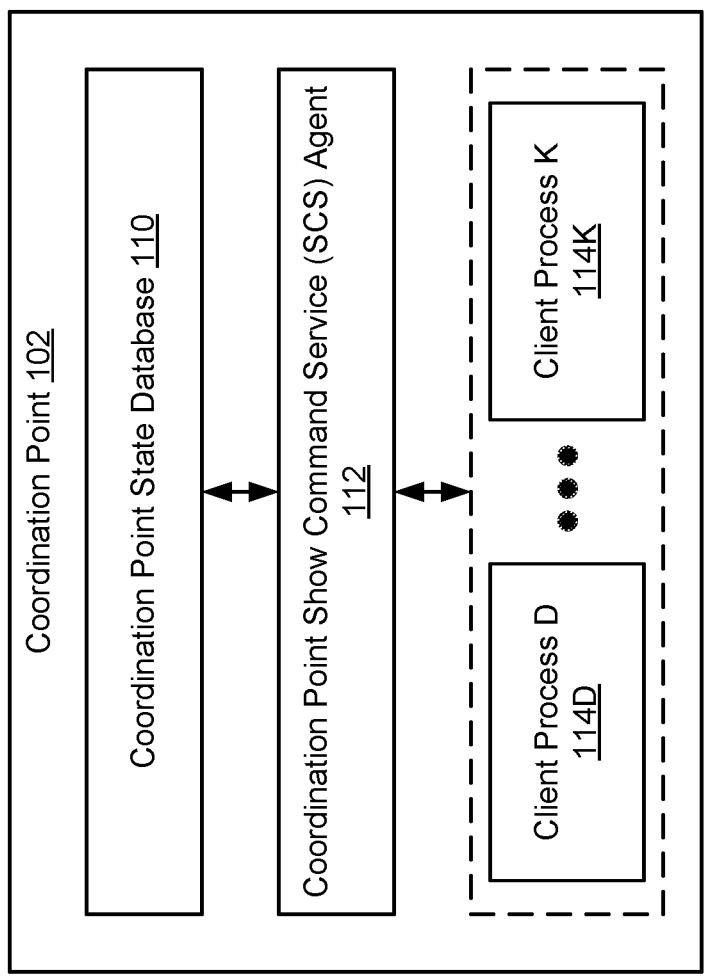
FIG. 1B shows a coordination point in accordance with one or more embodiments of the invention.

FIG. 1B shows a coordination point in accordance with one or more embodiments of the invention. The coordination point (102) includes a coordination point state database (110), a coordination point show command service (SCS) agent (112), and one or more client process(es) (114D, 114K). Each of these components is described below.

In one embodiment of the invention, the coordination point state database (110) includes the state of each of the network devices (see e.g., 108B, 108M in FIG. 1A) to which the coordination point (102) manages. Said another way, the coordination point state database may serve as a repository to consolidate state information pertaining to each of the network devices under the supervision of the coordination point. In one embodiment of the invention, the state of each of the network devices may include: (i) state information that has been provided to the coordination point by the network device; and (ii) the state information obtained from the one or more client entities (e.g., client devices (see e.g., FIG. 1A) or client processes (discussed below)) that is being sent to (or is scheduled to be sent to) the network device. Accordingly, the state of a network device (as specified in the network device state database (see e.g., 116 in FIG. 1C)) and the state of the network device maintained in the coordination point state database may be different. The aforementioned differences may be the result of state changes that have been made on the network device that have not been propagated to the coordination point and/or state changes that are scheduled to be sent to the network device but have yet to be sent.

In one embodiment of the invention, the coordination point state database (110) may be implemented using any type of database (e.g., a relational database, a distributed database, etc.). Further, the coordination point state database may be implemented in-memory (i.e., the contents of the coordination point state database may be maintained in volatile memory). Alternatively, the coordination point state database may be implemented using persistent storage. In another embodiment of the invention, the coordination point state database may be implemented as an in-memory database with a copy of the coordination point state database being stored in persistent storage. In such cases, as changes are made to the in-memory database, copies of the changes (with a timestamp) may be stored in persistent storage. The use of an in-memory database may provide faster access to the contents of the coordination point state database.

Those skilled in the art will appreciate that while the term "database" is used above, the coordination point state database (110) may be implemented using any known or later developed data structure(s) to manage and/or organize the content in the coordination point state database.

In one embodiment of the invention, the state information of the network device(s) that is stored in the coordination point state database (110) may include, but is not limited to: (i) information about (and/or generated by) all (or a portion of) services currently executing on the network device; (ii) the version of all (or a portion of) software executing on the network device; (iii) the version of all (or a portion of) firmware on the network device; (iv) hardware version information for all (or a portion of) hardware in the network device; and (v) information about all (or some) of the services, protocols, and/or features configured on the network device (e.g., show command service (SCS), multi-chassis link aggregation (MLAG), link aggregation control protocol (LACP), virtual extensible local area network (VX-LAN), link layer discovery protocol (LLDP), tap aggregation, data center bridging (DCB) capability exchange, access control list (ACL), virtual local area network (VLAN), virtual router redundancy protocol (VRRP), virtual address resolution protocol (VARP), spanning tree protocol (STP), open shortest path first (OSPF), border gateway protocol (BGP), routing information protocol (RIP), bidirectional forwarding detection (BFD), multi-protocol label switching (MPLS), protocol independent multicast (PIM), Internet control message protocol (ICMP), Internet group management protocol (IGMP), etc.), where this information may include information about the current configuration and status of each of the services, protocols, and/or features. In one embodiment of the invention, the coordination point state database includes control plane state information associated with the control plane of the network device. Further, in one embodiment of the invention, the coordination point state database includes data plane state information associated with the data plane of the network device. The coordination point state database may include other information without departing from the invention.

In one embodiment of the invention, the state information in the coordination point may be shared with one or more network device(s) using an asynchronous replication mechanism. More specifically, when state information is changed in the coordination point, the changed state information is first stored in the coordination point state database, and then a copy of the changed state information is transmitted to the one or more network device(s).

In one embodiment of the invention, the coordination point SCS agent (112) is one of numerous coordination point agents (not shown) that interact with the coordination point state database (110). Each coordination point agent facilitates the implementation of one or more protocols, services, and/or features of the coordination point (102). Examples of coordination point agents, other than the coordination point SCS agent, include, but are not limited to, a bug-alerts agent, a routing information base agent, a forwarding information base agent, and a simple network management protocol (SNMP) agent. Furthermore, each coordination point agent includes functionality to access various portions of the coordination point state database (110) in order to obtain the relevant portions of the state of one or more network device(s) in order to perform various functions. Additionally, each coordination point agent includes functionality to update the state of the one or more network device(s) by writing new and/or updated values in the coordination point state database, corresponding to one or more variables and/or parameters that are currently specified in the one or more network device(s).

In one embodiment of the invention, the coordination point SCS agent (112) particularly includes functionality to: (i) receive command requests (CRQs) (discussed below) from one or more client entities; (ii) identify to which network device(s) to send out modified CRQs; (iii) update the state of one or more network device(s) by writing (or publishing) the modified CRQs in the coordination point state database (110), at portions corresponding to the aforementioned identified network device(s); (iv) subscribe to and receive state change notifications (described below) from the coordination point state database; (v) obtain and process command responses (CMRs) (described below) from portions of the coordination point state database (e.g., portions corresponding to identified network device(s)); and (vi) provide consolidated command responses (CCRs) to one or more client entities.

In one embodiment of the invention, the one or more client process(es) (114D, 114K) may be, excluding the coordination point SCS agent, other coordination point agents executing on the coordination point (102). As discussed above, each of these client coordination point agents facilitate the implementation of one or more protocols, services, and/or features of the coordination point. Similar to client devices (see e.g., FIG. 1A), client processes include functionality to: (i) provide command requests (CRQs) to the coordination point SCS agent (112); and subsequently, (ii) receive consolidated command responses (CCRs) from the coordination point SCS agent. In one embodiment of the invention, the one or more client processes may include external agents, or agents executing on client devices (discussed above). In such an embodiment, an external agent may be, for example, a network management agent.

In one embodiment of the invention, the exchange of information between a client process and the coordination point SCS agent may be facilitated through any known or later developed inter-process communication mechanisms. As such, examples of known inter-process communications include, but are not limited to, the implementation of a file, a signal, a socket, a message queue, a pipeline, a semaphore, shared memory, message passing, and a memory-mapped file.

Figure 1C:
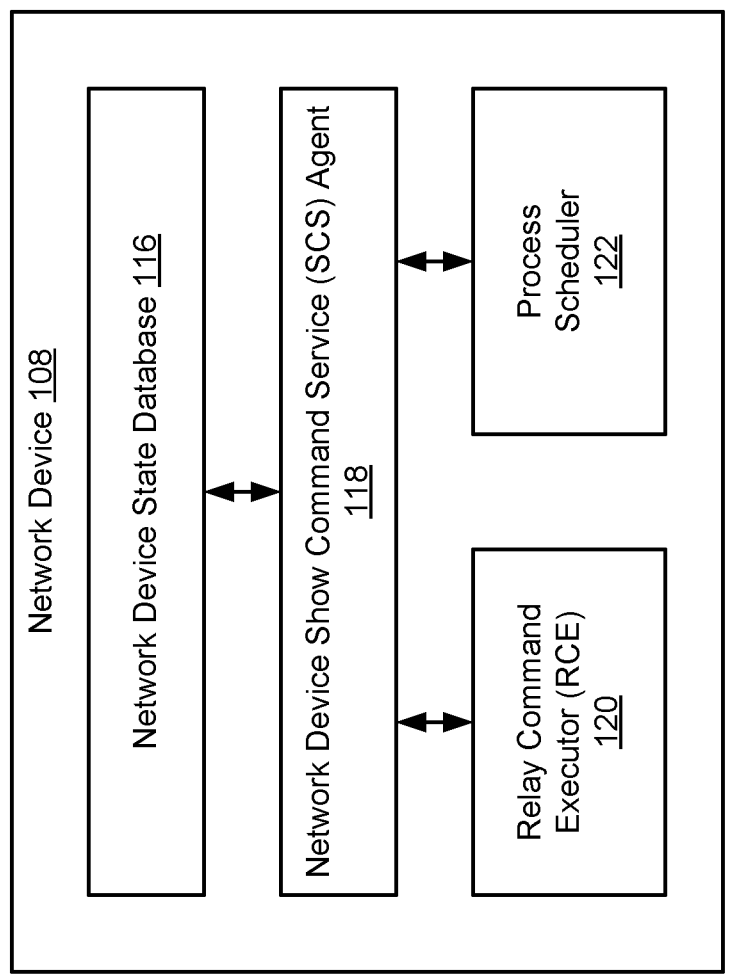
FIG. 1C shows a network device in accordance with one or more embodiments of the invention.

FIG. 1C shows a network device in accordance with one or more embodiments of the invention. The network device (108) includes a network device state database (116), a network device show command service (SCS) agent (118), a relay command executor (RCE) (120), and a process scheduler (122). Each of these components is described below.

In one embodiment of the invention, the network device state database (116) includes the current state of the network device (108). The state information stored in the network device state database may include, but is not limited to: (i) information about (and/or generated by) all (or a portion of the) services currently executing on the network device; (ii) the version of all (or a portion of the) software executing on the network device; (iii) the version of all firmware on the network device; (iv) hardware version information for all (or a portion of the) hardware in the network device; (v) information about the current state of all (or a portion of the) tables (e.g., routing table, forwarding table, etc.) in the network device that are used to process packets, where information may include the current entries in each of the tables, and (vi) information about all (or a portion of the) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the invention, the network device state database includes control plane state information associated with the control plane of the network device. Further, in one embodiment of the invention, the network device state database includes data plane state information associated with the data plane of the network device. The network device state database may include other information without departing from the invention.

In one embodiment of the invention, the network device state database (116) may be implemented using any type of database (e.g., a relational database, a distributed database, etc.). Further, the network device state database may be implemented in-memory (i.e., the contents of the network device state database may be maintained in volatile memory). Alternatively, the network device state database may be implemented using persistent storage. In another embodiment of the invention, the network device state database may be implemented as an in-memory database with a copy of the network device state database being stored in persistent storage. In such cases, as changes are made to the in-memory database, copies of the changes (with a timestamp) may be stored in persistent storage. The use of an in-memory database may provide faster access to the contents of the network device state database.

Those skilled in the art will appreciate that while the term "database" is used above, the network device state database (116) may be implemented using any known or later developed data structure(s) to manage and/or organize the content in the network device state database.

In one embodiment of the invention, the state information from the individual network devices may be shared with the coordination point using an asynchronous replication mechanism. More specifically, when state information is changed in the network device, the changed state information is first stored in the network device state database, and then a copy of the changed state information is transmitted to the coordination point.

In one embodiment of the invention, the network device show command service (SCS) agent (118) is one of numerous network device agents (not shown) that interact with the network device state database (116). Each network device agent facilitates the implementation of one or more protocols, services, and/or features of the network device (108). Examples of network device agents, other than the network device SCS agent, include, but are not limited to, a routing information base agent, a forwarding information base agent, and a simple network management protocol (SNMP) agent. Furthermore, each network device agent includes functionality to access various portions of the network device state database (116) in order to obtain the relevant portions of the state of the network device in order to perform various functions. Additionally, each network device agent includes functionality to update the state of the network device by writing new and/or updated values in the network device state database, corresponding to one or more variables and/or parameters that are currently specified in the network device.

In one embodiment of the invention, the network device SCS agent (118) particular includes functionality to: (i) subscribe to and receive state change notifications from the network device state database; (ii) subscribe to and receive scheduled task notifications from the process scheduler (122) (discussed below); (iii) obtain modified command requests (CRQs) and/or other state information from the network device state database (116); (iv) exchange information (e.g., relay command(s), command output(s), etc.) with the relay command executor (RCE) (120) (discussed below); (v) apply output filter expressions to command outputs; (vi) generate command responses (CMRs); (vii) update the state of the network device by writing (or publishing) the CMRs into the network device state database (116); and (viii) identify (or determine) recurrence periods (described below).

In one embodiment of the invention, the relay command executor (RCE) (120) may be a process (or a program) executing on the network device (108) that is configured to communicate with other processes on the network device, such as the network device SCS agent (118). More specifically, the RCE may be a relay command interpreter—a program purposed with executing instructions (e.g., relay commands) in order to produce a result set. Subsequently, in one embodiment of the invention, the RCE includes functionality to: (i) receive relay commands from the network device SCS agent; (ii) interpret (or execute) the relay commands to generate corresponding result sets (e.g., command outputs) (discussed below); and (iii) provide the generated command outputs back to the network device SCS agent.

In one embodiment of the invention, the process scheduler (122) may be a component of the operation system (not shown) of the network device (108) that is configured to interact with processes (e.g., network device agents), such as the network device SCS agent (118). More specifically, the process scheduler may manage allocation of the one or more processor(s) of the network device to processes awaiting execution. To this end, the process scheduler includes functionality to: (i) dictate which process executes at what time; (ii) pause the execution of one process in order to prioritize the execution of another; (iii) facilitate, manage, and/or organize the periodic performance of one or more protocols, services, and/or features of the network device (if necessary); and (iv) issue and provide scheduled task notifications, to registered processes, at specified recurrence periods (discussed below).

One skilled in the art will recognize that the architecture of the system, a coordination point, a network device, and of the network is not limited to the components shown in FIGS. 1A-1C. For example, the network may include any number and any type of network devices participating in the sharing of states. Further, the coordination point and the network devices may include components not shown in FIGS. 1B and 1C, respectively.

Figure 2A:
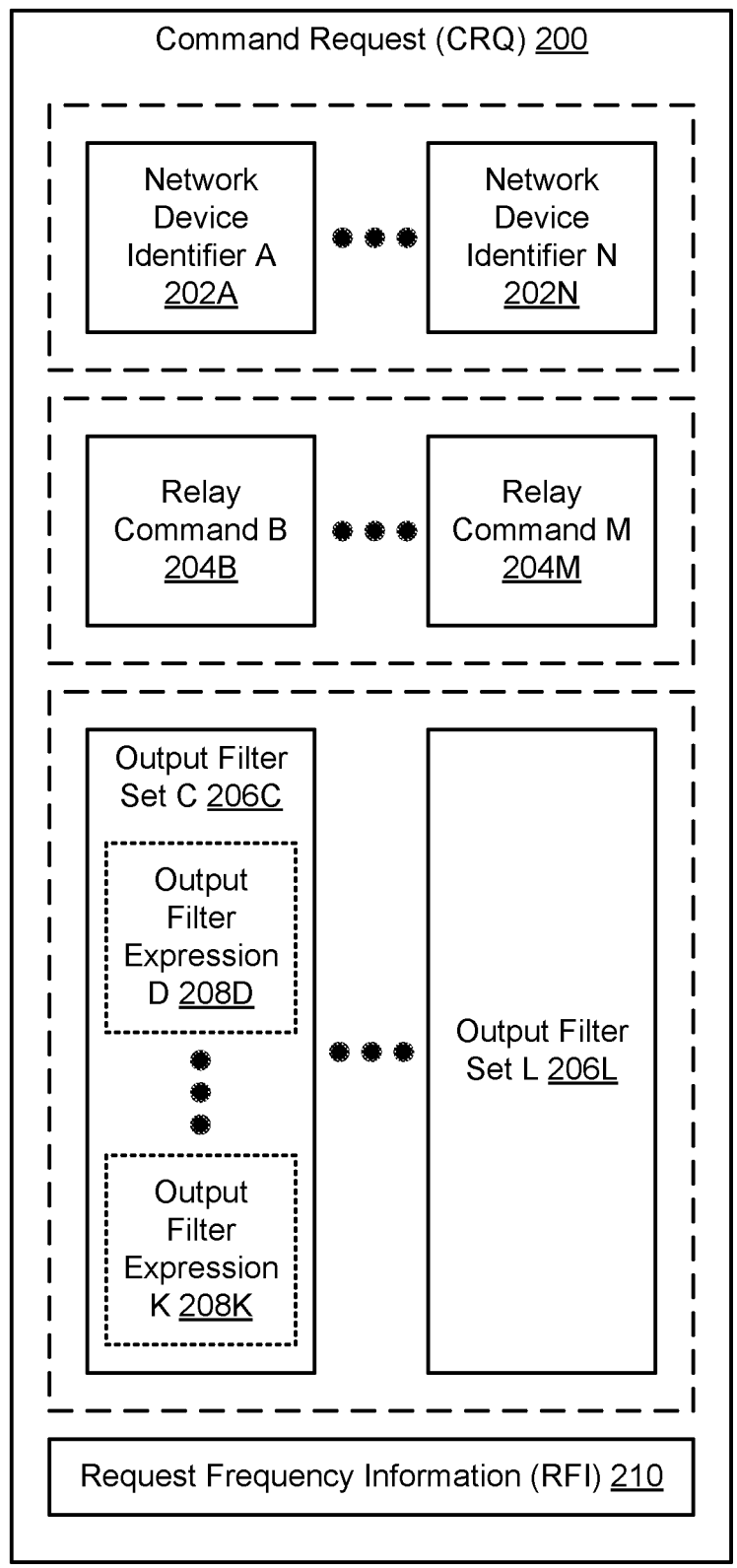
FIG. 2A shows a command request in accordance with one or more embodiments of the invention.

FIG. 2A shows a command request in accordance with one or more embodiments of the invention. In one embodiment of the invention, a command request (CRQ) is a standing request. The command request (CRQ) (200) may include one or more network device identifier(s) (202A, 202N), one or more relay command(s), (204B, 204M), one or more output filter set(s) (206C, 206L), and request frequency information (RFI) (210). Each of these components is described below.

In one embodiment of the invention, a network device identifier (202A, 202N) may be representative of information that uniquely identifies a network device. The network device identifier may take the form of the product name, model number, serial number, media access control (MAC) address, any other information that uniquely identifies the network device, or any combination thereof.

In one embodiment of the invention, a relay command (204B, 204M) may be a command line interface (CLI) instruction directed at providing insight into the operational status of a network device. More specifically, a relay command enables the client entity (e.g., client device, client process/agent, etc.) to procure any current configuration and/or state information pertaining to a network device. Subsequently, state information on a network device may include, but is not limited to, control plane state information associated with the control plane of the network device and data plane state information associated with the data plane of the network device. In one embodiment of the invention, a relay command is a "show" command, which may be used to display specified content stored in the network device state database. Further, in one embodiment of the invention, a relay command relates to information concerning one protocol, service, and/or feature on a network device. In one embodiment of the invention, multiple relay commands may be relayed to a network device via a command request (CRQ) in order to obtain information pertinent to several (and different) protocols, services, and/or features on a network device.

In one embodiment of the invention, an output filter set (206C, 206L) may be a collection of (e.g., includes one or more) output filter expression(s) (or filter functions) (208D, 208K). In such an embodiment, an output filter expression may be a data processing element that assesses a result set (e.g., command output (discussed below)), obtained from the execution of a relay command, and provides a refined result set (e.g., a subset of the result set) based on a specified criterion. Further, multiple output filter expressions may be included within an output filter set in order to procure different subsets of information presented in the result set. In another embodiment of the invention, an output filter set (206C, 206L) may be an empty set. In other words, zero output filter expressions would be specified. In such an embodiment, the client entity expects the full result set of the relay command, and therefore, no further refining of the result set is required.

In one embodiment of the invention, the number of output filter sets (206C, 206L) equals the number of relay commands (204B, 204M) specified in a command request (CRQ) (200). Subsequently, each result set (derived from the execution of a relay command) retains a corresponding output filter set that may be applied in order to procure the different granularities of information sought by the client entity. In another embodiment of the invention, in addition to the requisite of providing one output filter set to one relay command, an extra output filter set may be provided. The extra output filter set may include one or more output filter expression(s) that may provide a second layer of processing, applied to the first refined results set(s) (e.g., first result set subset(s)) separately or in combination, thereby yielding a more concise result set subset. Further, in such an embodiment, the extra output filter set may be extracted from the CRQ by the coordination point show command service (SCS) agent (see e.g., FIG. 1B), thereby modifying the received CRQ and subsequently, sharing the modified CRQ to the one or more identified network device(s). To this end, upon obtaining one or more command response(s) (CMRs) from the one or more identified network device(s), the coordination point SCS agent may apply (or further process) the result set subsets in each of the obtained CMRs, separately or in combination, in order to provide a reduced stream of information to the client entity. Additional and/or alternative components (e.g., one or more network device identifier(s), etc.) may be extracted, by the coordination point SCS agent, without departing from the invention.

In one embodiment of the invention, request frequency information (RFI) (210) may refer to information describing the cyclic or non-cyclic requirements of the associated request. In one embodiment of the invention, the provided RFI may specify that the associated request is a one-time activity. In such an embodiment, the modified CRQ is processed once by the network device SCS agent, when the modified CRQ is initially received, then forgotten. In another embodiment of the invention, the provided RFI may specify that the associated CRQ is a recurring activity. In such an embodiment, the modified CRQ is processed by the network device SCS agent every time a specified recurrence period (or time interval) elapses. In one embodiment of the invention, the recurrence period may be provided, by a client entity, as a portion of the RFI. In another embodiment, a client entity may not disclose a specified recurrence period. In such an embodiment, the task of determining a recurrence period, for the associated request, falls to the network device SCS agent, which evaluates numerous factors pertaining to the network device, in order to establish a viable time interval. Such factors may include, for example: (i) the existing computational overhead on the network device; (ii) the importance of freshness of data generated by processing the modified CRQ; and (iii) the elapsed time necessary to complete the processing of the modified CRQ.

Figure 2B:
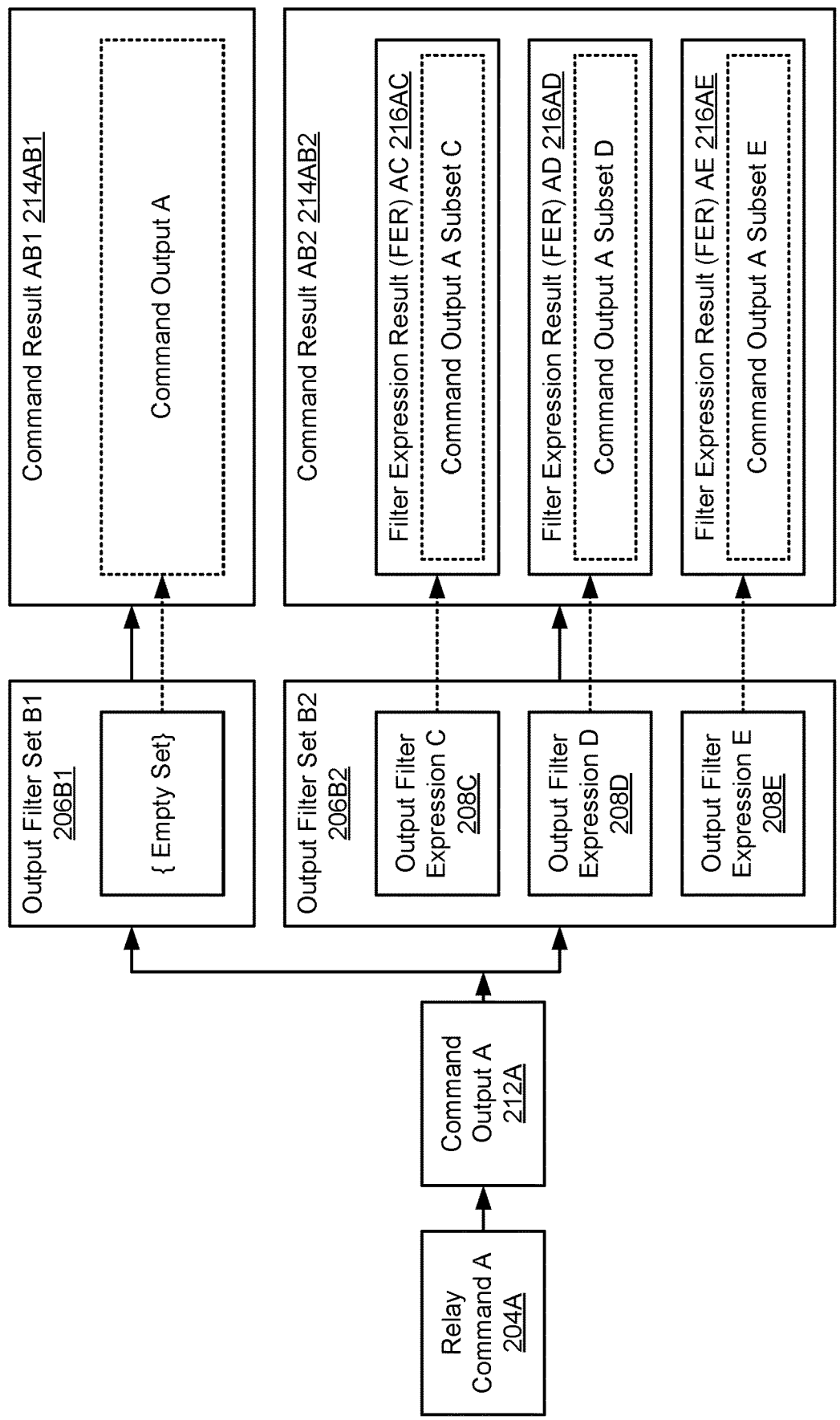
FIG. 2B shows a flowchart that describes the derivation of a command result in accordance with one or more embodiments of the invention.

FIG. 2B shows a flowchart that describes the derivation of a command result in accordance with one or more embodiments of the invention. In one embodiment of the invention, a command result (214AB1, 214AB2) may be a data structure that encapsulates and organizes content representative of the one or more subset(s) of the command output (212A) (e.g., result set) of an executed relay command (204A).

In one embodiment of the invention, FIG. 2B, more specifically, shows the possibilities of content in a command result (214AB1, 214AB2) based on the application of variations of output filter sets (206B1, 206B2) onto a same command output (212A). For example, there may be a relay command A (204A), which may be obtained by the network device SCS agent (see e.g., FIG. 1C) from the coordination point. Post execution of the relay command (discussed below with respect to FIG. 4A), the network device SCS agent obtains a command output (e.g., result set (discussed above)) (212A). Next, the output filter set, corresponding to the relay command, and also obtained from the received CRQ, may be applied onto the resulting command output. In one embodiment of the invention, the output filter set (206B1) is an empty set (e.g., includes zero output filter expressions). In such an embodiment, further processing of the command output is omitted, and accordingly, a command result (214AB1) is generated that includes the full result set (or unprocessed command output (212A)) of the executed relay command (204A).

In another embodiment of the invention, as discussed above, the output filter set (206B2) may include one or more output filter expression(s) (208C, 208D, 208E). In such an embodiment, the different output filter expressions applied to the command output (212A) yield different subsets of the command output. In one embodiment of the invention, each of these command output subsets may be referred as a filter expression result (FER) (216AC, 216AD, 216AE). Upon acquiring the one or more FER(s), corresponding to processing of the command output by the one or more output filter expression(s), a command result (214AB2) is generated that includes the one or more FER(s).

Figure 2C:
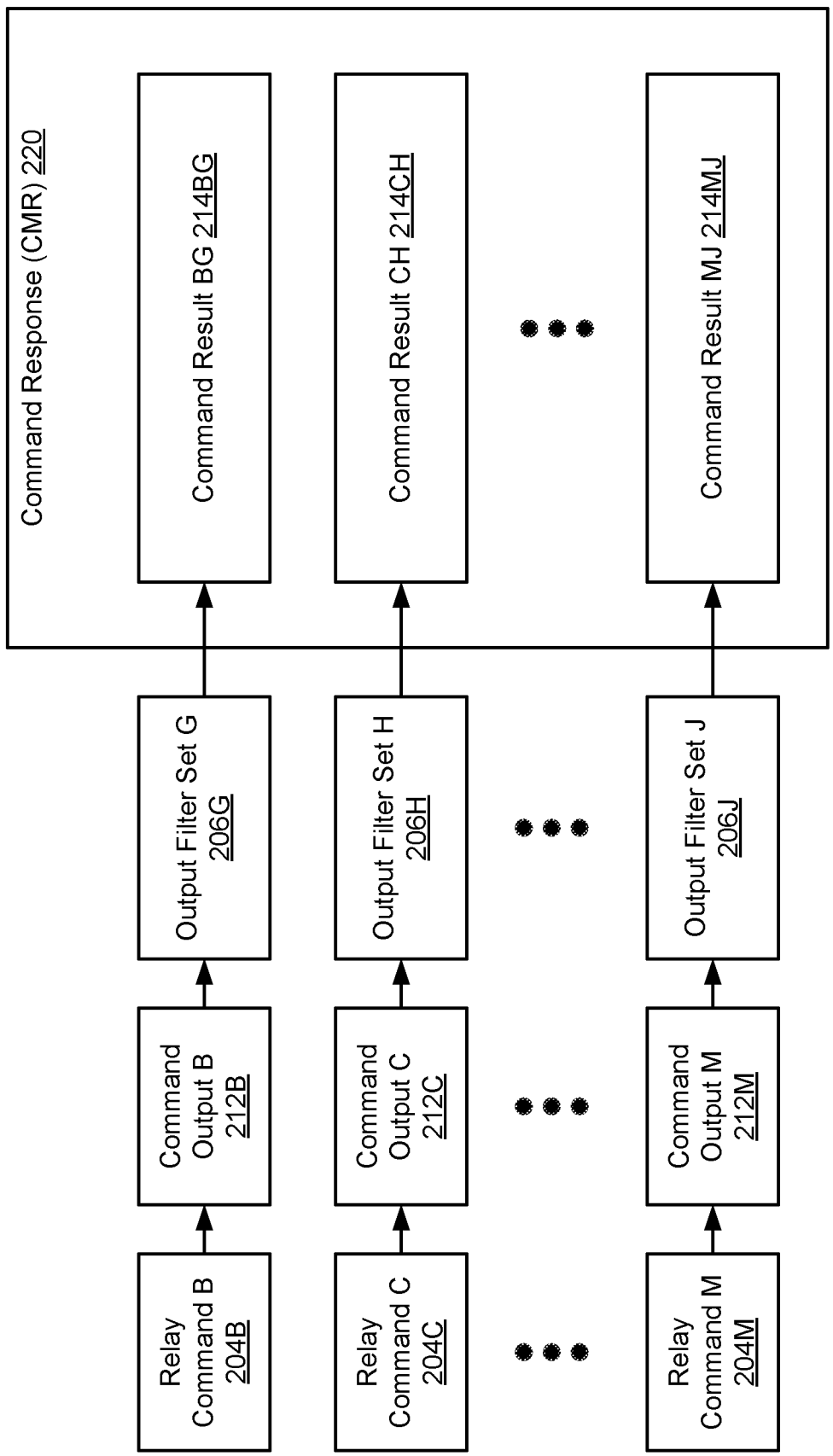
FIG. 2C shows a flowchart that describes the derivation of a command response in accordance with one or more embodiments of the invention.

FIG. 2C shows a flowchart that describes the derivation of a command response in accordance with one or more embodiments of the invention. In one embodiment of the invention, a command response (CMR) (220) may be a data structure that encapsulates and organizes a collection of (e.g., one or more) command results. As discussed above, the execution of each relay command (204B, 204C, 204M) produces a command output (212B, 212C, 212M). Subsequently, a corresponding output filter set (206G, 206H, J) is applied to each command output, yielding a command result (214BG, 214CH, 214MJ). The potentially numerous command results are ultimately bundled as a CMR which also represents the end result that the network device provides to the coordination point in response to receiving a command request (CRQ).

Figure 2D:
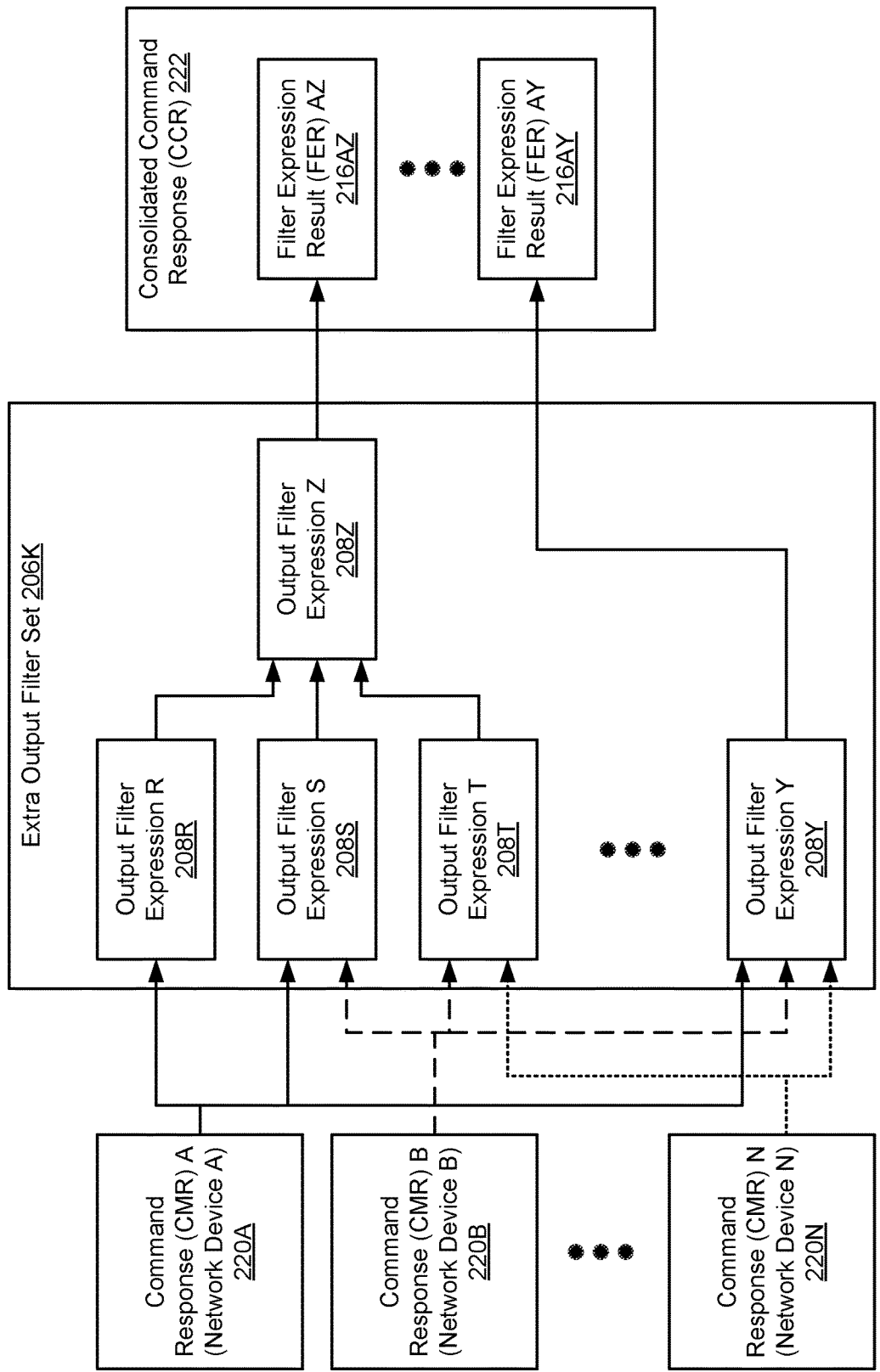
FIG. 2D shows a flowchart that describes the derivation of a consolidated command response in accordance with one or more embodiments of the invention.

FIG. 2D shows a flowchart that describes the derivation of a consolidated command response in accordance with one or more embodiments of the invention. In one embodiment of the invention, a consolidated command response (CCR) (222) may be a data structure that encapsulates and organizes the final results associated with processing a CRQ on the identified set of network devices. In one embodiment of the invention, these aforementioned final results may be derived from subjecting each of the received command responses (CMRs) (220A, 220B, 220N) through further filtering by an extra output filter set (206K). In such an embodiment, each of the output filter expressions comprising the extra output filter set, may be applied to any combination of the received CMRs. For example, further filtering may be done on one particular CMR, one or more CMRs may be fed into a single output filter expression, or output filter expressions may be used in a cascade towards processing one or more CMRs. Each of these scenarios are represented in the flowchart of FIG. 2D. Following the additional processing, (secondary) filter expression results (FERs) may be obtained (216AZ, 216AY). The secondary FERs may be combined by the coordination point SCS into a CCR that is provided to the client entity.

Figure 3:
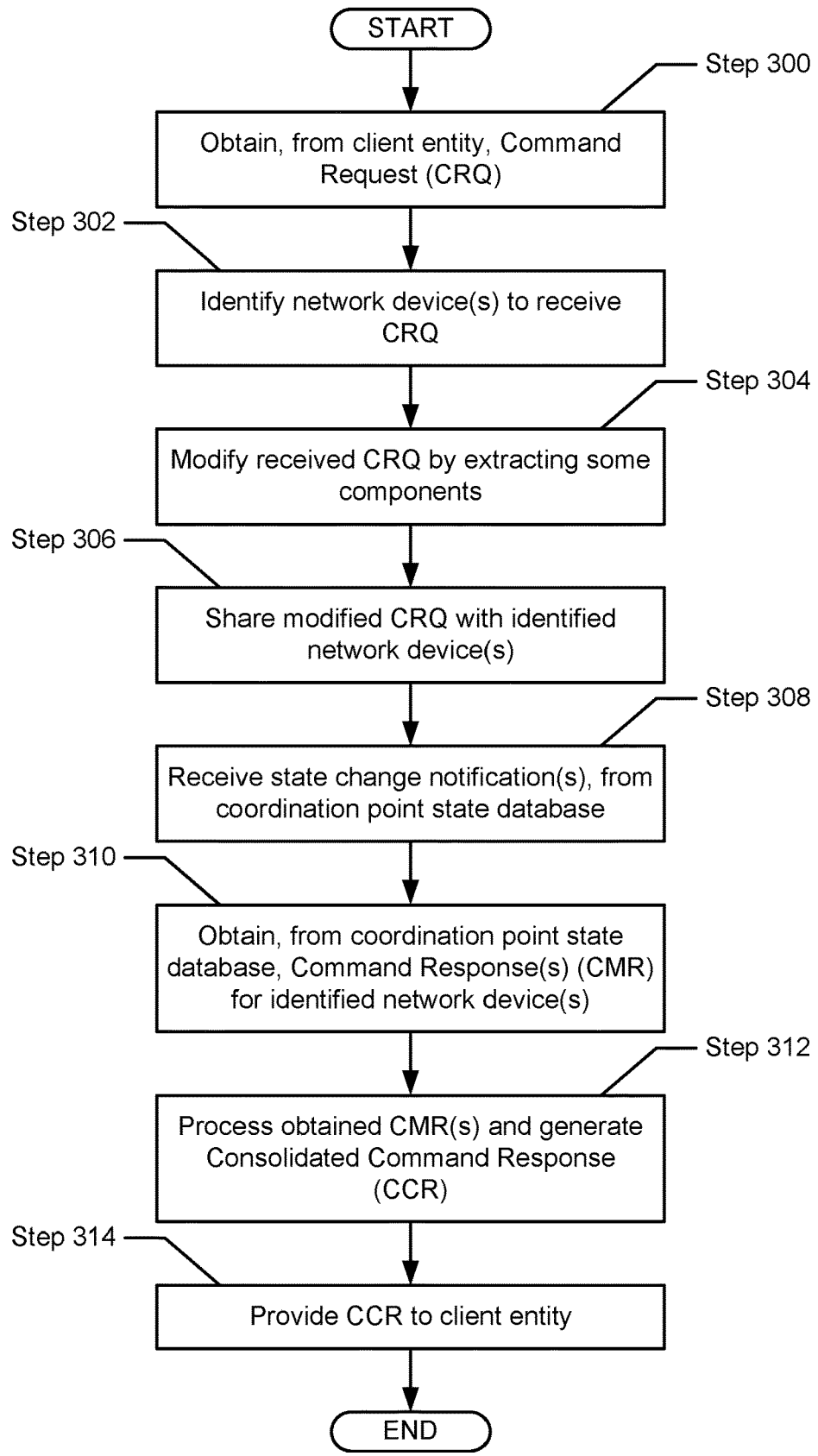
FIG. 3 shows a flowchart that describes a method for receiving a command request from, and providing a consolidated command response to, a client entity in accordance with one or more embodiments of the invention.

FIGS. 3-4C show flowcharts in accordance with one or more embodiments of the invention. While the various steps in the flowcharts are presented and described sequentially, one of ordinary skill will appreciate that some or all of the steps may be executed in different orders, may be combined or omitted, and some or all steps may be executed in parallel. In one embodiment of the invention, the steps shown in FIGS. 3-4C may be performed in parallel with any other steps shown in FIGS. 3-4C without departing from the invention.

Turning to FIG. 3, FIG. 3 shows a flowchart that describes a method for receiving a command request from, and providing a command response to, a client entity in accordance with one or more embodiments of the invention. In Step 300, a command request (CRQ) is obtained from a client entity. As discussed above, in one embodiment of the invention, the client entity may be a client device (see FIG. 1A), whereas in another embodiment of the invention, the client entity may be a client process (see FIG. 1B).

In Step 302, the received CRQ is processed in order to identify the one or more network device(s) to which the CRQ may be directed. Referencing the above discussion with respect to FIG. 2A, in one embodiment of the invention, one or more network device identifiers may be specified by the client entity, and thus be included within the received CRQ. Network device(s) are identified based on these aforementioned network device identifier(s).

In Step 304, the received CRQ is modified to exclude one or more components of the received CRQ. As discussed above, a received CRQ may include one or more network device identifier(s), one or more relay command(s), one or more output filter set(s), and request frequency information (RFI). In one embodiment of the invention, the resulting modified CRQ may retain the minimal components necessary for the network device SCS agent, on a network device, to perform embodiments of the invention. In one embodiment of the invention, the extracted components may include, for example, the one or more network device identifier(s), and at most one output filter set. As mentioned above, in a received CRQ, there should at least be the same number of output filter sets as relay commands provided. In one embodiment of the invention, when an extra output filter set is presented, that extra output filter set may include one or more output filter expression(s) that may be applied to the one or more command CMR(s), consolidated at the coordination point state database, prior to being provided to the appropriate client entity. Subsequently, in one embodiment of the invention, the modified CRQ may include, for example, the one or more relay command(s), one or more output filter set(s)—the number of which matches the number of relay commands—and the RFI.

In Step 306, the modified CRQ is shared with the one or more identified network device(s). In one embodiment of the invention, the modified CRQ may be shared by writing the modified CRQ into the coordination point state database. More specifically, for each of the one or more identified network device(s), the subset of the consolidated state information in the coordination point state database corresponding to the respective network device may be selected. In one embodiment of the invention, selection of the aforementioned subset may be based on matching a respective network device identifier, obtained from processing the received CRQ (in Step 302), with a similar network device identifier representing the root of the subset within the hierarchy of state information within the coordination point state database. Following this selection step, the modified CRQ may be copied into the selected subset of consolidated state information. Further, in one embodiment of the invention, the modified CRQ may be deposited as state information referring to a portion of the aforementioned subset that which may be designated for the show command service (SCS).

At this point, in one embodiment of the invention, writing the modified CRQ into the coordination point state database may be indicative of a state change. Subsequently, the change may be pushed to the network device state database of the one or more identified network device(s), through the asynchronous replication mechanism discussed above. Similarly, when a state change occurs on a network device state database, the change may be pushed into the coordination point state database, under the subset of the consolidated state information corresponding to the network device providing the state change. After the coordination point state database updates the consolidated state information to include the state change, the coordination point state database proceeds in notifying one or more agent(s) of the state change. In one embodiment of the invention, the one or more agent(s) notified may have registered/subscribed to receive notice upon changes occurring relative to one or more protocols, services, and/or features that which the one or more agent(s) require in order to implement other relevant responsibilities.

At this stage, each of the identified network devices processes the received CRQ, for example, in accordance with FIGS. 4A-4C. The resulting CMRs may then be provided to the coordination point as described in step 308.

Proceeding with the discussion of FIG. 3, in Step 308, indicating a state change, one or more state change notification(s) are received from the coordination point state database. In one embodiment of the invention, each notification corresponds to a state change from each of the one or more network device(s) identified in Step 302. More specifically, upon processing the modified CRQ (discussed below), each of the identified network device(s) share their respective command response (CMR) with the coordination point, which consequently, may trigger a state change notification to be issued.

In Step 310, in response to receiving the one or more state change notification(s), the state change(s) (e.g., one or more CMR(s)) are obtained from the coordination point state database. In one embodiment of the invention, path information directing the coordination point SCS agent to the state change in the coordination point state database may be included within a state change notification. In another embodiment of the invention, the state change (e.g., CMR) itself may be included within a state change notification.

One skilled in the art will recognize that state change notifications corresponding to different network devices may be received at different times. For example, process scheduling priorities, processing time of the modified CRQ, etc. may differ for different network devices, thereby delaying the sharing of respective CMRs accordingly. In one embodiment of the invention, prior to proceeding with Step 312, the coordination point SCS agent may await until all state changes expected from the one or more identified network device(s) are obtained. In another embodiment of the invention, Step 312 may be pursued for each CMR as the CMR becomes available in the coordination point state database.

In Step 312, the obtained state change(s) (e.g., one or more CMR(s)) is processed and a consolidated command response (CCR) is generated. In one embodiment of the invention, processing applied to the one or more CMR(s) may involve the application of the extra output filter set, if any, that would have been extracted during Step 304. In such an embodiment, the one or more output filter expression(s), within the extra output filter set, may be used to further reduce the dimensionality of the obtained responses from the one or more identified network device(s). Subsequently, a CCR may be generated, geared towards encapsulating and organizing the one or more processed (or unprocessed) CMR(s). Accordingly, in Step 314, the CCR, generated in Step 312, is provided to the client entity (e.g., the client device or client process).

FIG. 4A shows a flowchart for processing a modified command request (CRQ) in accordance with one or more embodiments of the invention. In Step 400, an event notification regarding a state change in the network device state database is received by the network device SCS agent (118). In one embodiment of the invention, the event notification may be a state change notification, whereupon the notification issuer is the network device state database. Similar to the behavior of the coordination point state database (discussed above), upon identifying a state change, the network device state database issues and relays one or more state change notification(s), addressed to one or more network device agent(s). In another embodiment of the invention, the event notification may be a scheduled task notification, whereupon the notification issuer is the process scheduler (see e.g., FIG. 1C). The process scheduler generates and forwards scheduled task notifications when a specified recurrence period (or time interval), corresponding to a registered process, elapses. The scheduled task notification is sent to the process (or processes) which recurrence periods have elapsed. Accordingly, depending on the embodiment, the network device state database and/or the process scheduler may be referred to as a notification issuer.

In Step 402, in response to receiving the event notification (in Step 400), the state change (e.g., modified CRQ) is obtained from the network device state database. In one embodiment of the invention, path information directing the network device SCS agent to the state change in the network device state database may be included within the event notification. In Step 404, the modified CRQ is processed to generate a command response (CMR). Details pertaining to Step 404 may be found in the discussion below with respect to FIG. 4B.

In Step 406, a determination is made as to whether the generated CMR includes at least one difference (with respect to a previously generated CMR). In one embodiment of the invention, a generated CMR may be the result of processing a modified CRQ with RFI (see FIG. 2A) specifying the request as a one-time activity. In such an embodiment, the previously generated CMR may be represented by a null, thus the (currently) generated CMR would include substantial differences. In another embodiment of the invention, a generated CMR may be the result of processing a modified CRQ with RFI specifying the request as a recurring activity. In such an embodiment, the previously generated CMR may be represented by a null, indicating that the modified CRQ is being processed for the first time. Similar to the one-time activity embodiment, the (currently) generated CMR would yield substantial differences. Alternatively, in the recurring activity embodiment, the previously generated CMR may be the CMR generated during the previous iteration that which the modified CRQ was processed. In this case, and in each recurring period, the (currently) generated CMR may be stored as the previously generated CMR for reference in the next iteration. Any differences between the (currently) generated CMR and the previously generated CMR may be identified through comparison of the two CMRs. Pursuant to this case, in yet another embodiment of the invention, the (currently) generated CMR may not exhibit any differences with respect to the previously generated CMR. In view of these embodiments, if a determination is made that there is at least one difference in the generated CMR, then the process proceeds to Step 408; otherwise, if a determination is made that the generated CMR has not changed, then the process ends.

In Step 408, upon determining that the generated CMR includes at least one difference (with respect to the previously generated CMR), the generated CMR is shared with the coordination point. In one embodiment of the invention, the generated CMR may be shared by writing the generated CMR into the network device state database. More specifically, the generated CMR may be deposited as state information referring to a segment, of the state information in the network device state database, designated for the show command service (SCS).

In one embodiment of the invention, a request (e.g., modified CRQ) that is recurring-specified by the embedded RFI may proceed to Step 410. In Step 410, the modified CRQ is registered with the process scheduler. In one embodiment of the invention, the registration subscribes the network device SCS agent to receive scheduled task notifications from the process scheduler. In one embodiment of the invention, information provided to the process scheduler upon registering the request includes, for example: (i) a unique identifier associated with the network device SCS agent, informing the process scheduler to which process (or agent) the scheduled task notification is to be sent; (ii) path information representing the address of the modified CRQ in the network device state database; and (iii) an identified recurrence period specifying a time interval, which when elapsed, triggers the deliverance of the scheduled task notification and subsequently, the re-processing of the modified CRQ by the network device SCS agent.

In one embodiment of the invention, the aforementioned recurrence period may be identified based on the RFI within the modified CRQ. As described above (see FIG. 2A), for a recurring-specified request, the RFI may include a predetermined time interval specified by the client entity. In such an embodiment, the predetermined time interval may be registered as the recurrence period for the modified CRQ. In another embodiment of the invention, the RFI may not include a predetermined time interval specified by the client entity. In such an embodiment, a recurrence period for the modified CRQ is determined based on a number of factors. These factors, separately or in combination, may include, but are not limited to: (i) the existing computational overhead on the network device; (ii) the importance of freshness of data generated by processing the modified CRQ; and (iii) the elapsed time necessary to complete the processing of the modified CRQ. When evaluating the time taken to process the modified CRQ, for example, if processing takes a relatively short amount of time, the recurrence period may be set to a short time interval as well, thus indicating that processing the modified CRQ may not overburden the network device and frequent re-processing is allowed. Alternatively, if processing takes a relatively long amount of time, the recurrence period may be set, similarly, to a longer time interval, thereby indicating that processing the modified CRQ may represent a bottleneck for operations occurring on the network device, and the frequency of re-processing should be restricted.

FIG. 4B shows a flowchart that describes a method for generating a command response in accordance with one or more embodiments of the invention. As discussed above, the steps to follow, with regard to FIG. 4B, detail the processing of the modified CRQ (in Step 404, FIG. 1A) in order to generate a command response (CMR).

In Step 420, the one or more relay command(s), one or more output filter set(s), and the request frequency information (RFI) are obtained from the modified CRQ. In Step 422, a relay command is provided to the relay command executor (RCE). As discussed above (see FIG. 1C), in one embodiment of the invention, the relay command may be provided to the RCE via an inter-process communication mechanism, such as, for example, implementation of a file, a signal, a socket, a message queue, a pipeline, a semaphore, shared memory, message passing, and a memory-mapped file.

In Step 424, a command output is received from the RCE. As previously mentioned, in one embodiment of the invention, the RCE is representative of a relay command interpreter, which includes functionality to execute a relay command, thereby obtaining a corresponding full result set (e.g. the command output). In one embodiment of the invention, the command output may be received through any one of the aforementioned inter-process communication mechanisms.

In Step 426, an output filter set (corresponding to the relay command) is applied onto the command output, received in Step 424, to obtain a command result. Details pertaining to Step 426 may be found in the discussion below with respect to FIG. 4C.

Proceeding with the discussion of FIG. 4B, in Step 428, a determination is made as to whether other relay commands, if any, obtained from the modified CRQ (in Step 420), requires interpretation (e.g., execution). If a determination is made that other relay commands have yet to be interpreted, then the process repeats Steps 422-426 for another relay command that which a corresponding command result has yet been acquired. Conversely, if a determination is made that there are no other relay commands remain to be interpreted, then the process proceeds to Step 430.

In Step 430, upon determining that no other relay commands require processing, a command response (CMR) is generated. In one embodiment of the invention, the CMR may be a data structure where which one or more command result(s), obtained in Step 426, may be encapsulated and organized. Such packaging may serve to facilitate the sharing of the generated CMR with the coordination point (discussed above).

FIG. 4C shows a flowchart describing a method for generating a command result in accordance with one or more embodiments of the invention. As discussed above, the steps to follow, with regard to FIG. 4C, detail the application of an output filter set to a corresponding command output (e.g., full result set obtained from executing a corresponding relay command) (see Step 426, FIG. 4B) in order to generate a command result.

In Step 440, a determination is made as to whether the output filter set is an empty set (e.g., includes zero output filter expressions). In one embodiment of the invention, an empty output filter set specifies that the full result set (or command output), associated with the corresponding relay command, is expected to be shared with the coordination point. In view of this, if a determination is made that the output filter set is an empty set, the process proceeds to Step 448; otherwise, if a determination is made that the output filter set includes at least one output filter expression, then the process proceeds to Step 442.

In Step 442, the one or more output filter expression(s), included within the output filter set, is extracted. As discussed above (see FIG. 2A), in one embodiment of the invention, an output filter expression may be a data processing element that assesses a result set (e.g., command output) obtained from the execution of a relay command, and provides a refined result set (e.g., a subset of the result set) based on a specified criterion. Further, in one embodiment of the invention, multiple output filter expressions may be provided in order to obtain different subsets of the command output.

In Step 444, an output filter expression, extracted from the output filter set in Step 442, is applied to the command output, thereby obtaining a filter expression result (FER). In one embodiment of the invention, the FER may be representative of the aforementioned command output subset. Further, in one embodiment of the invention, the FER (or a subset of the command output) may refer to an attribute of the data structure that may represent the full result set.

In Step 446, a determination is made as to whether additional output filter expressions, extracted from the output filter set (in Step 442), need be applied to the command output. If a determination is made that there are at least one additional output filter expression, the process repeats Step 444, obtaining a corresponding FER for the additional output filter expression(s). Conversely, if a determination is made that there are no additional output filter expressions awaiting to be applied to the command output, the process proceeds to Step 448.

In Step 448, upon determining that no additional output filter expressions await application onto the command output, a command result is generated. In one embodiment of the invention, the command result may be a data structure where which one or more FER(s) may be encapsulated and/or organized for transport convenience. In another embodiment, when the output filter set is an empty set (see e.g., Step 440), and zero FERs are obtained since zero output filter expressions were included in the output filter set, the generated command result may merely include the full result set (e.g., the command output).

FIGS. 5A-5F show an example in accordance with one or more embodiments of the invention. The example is not intended to limit the scope of the invention.

Figure 5A:
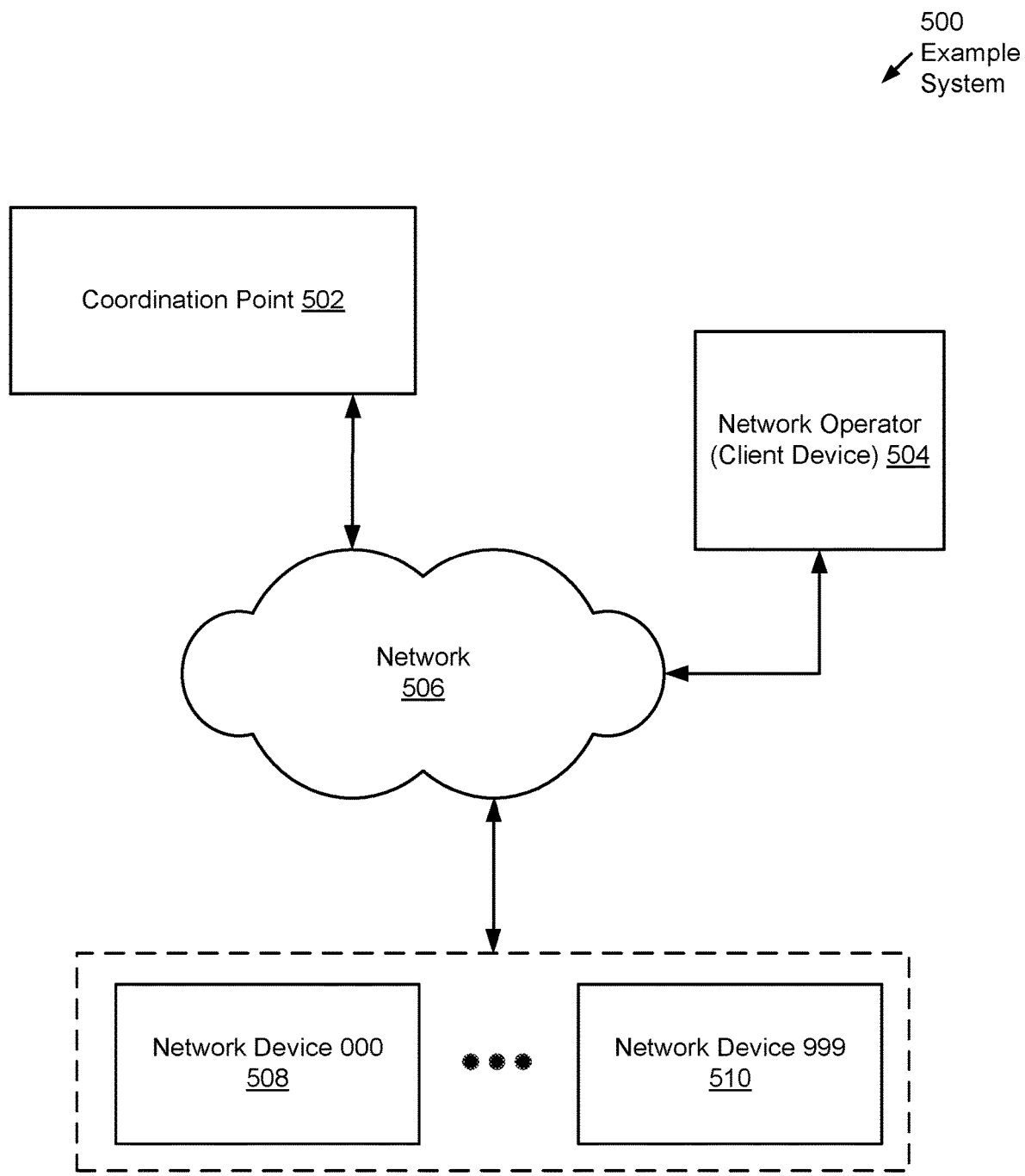
FIG. 5A shows an example system in accordance with one or more embodiments of the invention.

Turning to FIG. 5A, FIG. 5A shows an example system in accordance with one or more embodiments of the invention. The example system (500) includes a coordination point (502), a network operator (e.g., client device) (504), and numerous network devices (508, 510) operatively connected through a network (506). Further, consider the scenario whereupon the network operator engages the show command service (SCS), running on the coordination point and managed network devices, in order to procure operational information pertaining to a subset of the managed network devices. In using the show command service, the network operator is able to attain additional granularities of information, regarding specified network devices, that may not have been programmed into the network devices pre-deployment.

Figure 5B:
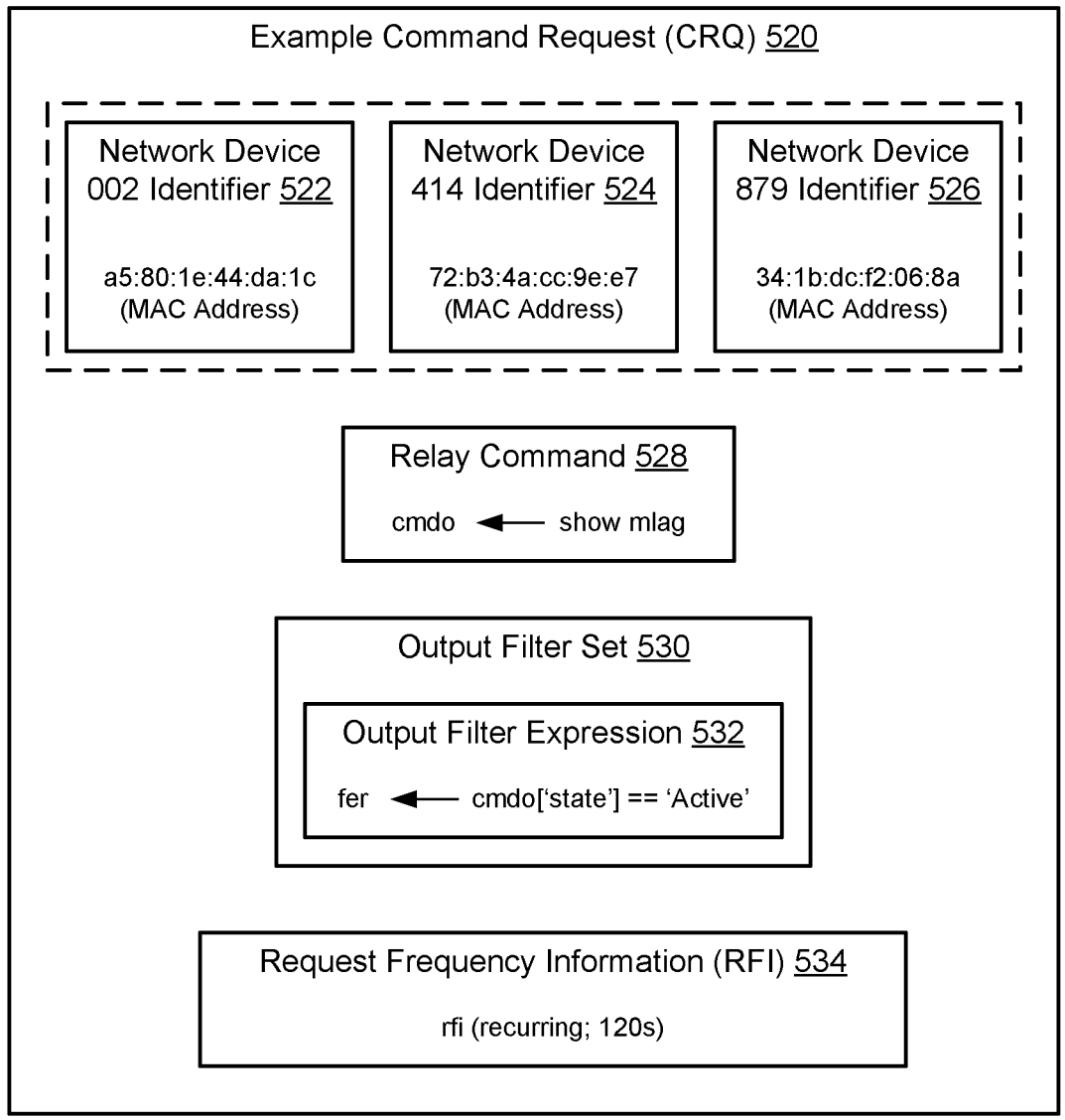
FIG. 5B shows an example command request in accordance with one or more embodiments of the invention.

FIG. 5B shows an example command request in accordance with one or more embodiments of the invention. Following the aforementioned scenario, the network operator generates and transmits the example command request (CRQ) (520) to the coordination point SCS agent (not shown) on the coordination point. The example CRQ includes a set of network device identifiers (522, 524, 526), thereby specifying the network devices from which operational information is requested. In the example, the network device identifiers provided are represented by the media access control (MAC) addresses associated with the specified network devices 002, 414, and 879, respectively. Also included in the example CRQ are a relay command (528), an output filter set (530), and request frequency information (RFI) (534). The relay command provided is chosen to be the "show mlag" command, which displays information about the multi-chassis link aggregation (MLAG) configuration on a network device. Further, it is specified that the command output, resulting from executing the relay command, be stored in a variable named "cmdo". Moreover, the network operator provides an output filter set containing an output filter expression (532), which instructs the result of the logical criterion "cmdo['state']=='Active'" to be stored in the variable "fer". Said another way, the logical criterion inquires whether or not the 'state' attribute of the MLAG configuration information indicates that the service is active or enabled. Lastly, the network operator includes RFI designating that the request is a recurrent activity, which is to occur periodically every 120 seconds.

As discussed above, the coordination point SCS agent (not shown) receives the above described example CRQ (520). Subsequently, the coordination point SCS agent identifies the network device(s) to which the request is directed; the provided network device identifiers (522, 524, 526) mark network devices 002, 414, and 879 as the recipients. The coordination point SCS agent then modifies the received CRQ, removing the network device identifiers, which are not pertinent to the functionalities of the network device SCS agent, and shares the modified CRQ with network devices 002, 414, and 879 by writing the modified CRQ into the coordination point state database (not shown) at addresses respective to each network device. Through the asynchronous replication mechanism (discussed above), writing of the state change (e.g., modified CRQ), first, updates the information retained in the coordination point state database, then, transmits a copy of the state change to the network device state databases of the identified network devices. At each identified network device, upon attaining the modified CRQ, the network device state database detects the state change, and issues/sends a state change notification to any agents that have registered interest in the particular state change; subsequently, the network device SCS agent (not shown) is notified. At this point, upon receiving the issued state change notification, from the network device state database, the network device SCS agent obtains the state change (e.g., modified CRQ) associated with the received state change notification. Following this, the network device SCS agent processes the modified CRQ. Foremost, the relay command (528) is provided to the relay command executor (RCE) (not shown), which executes, and delivers the result set (or command output) back to the network device SCS agent.

FIG. 5C shows an example command output in accordance with one or more embodiments of the invention. The information pertaining to MLAG configuration, status, and ports represent the command output (540) (or full result set) obtained from executing the aforementioned "show mlag" relay command.

FIG. 5D shows an example command result in accordance with one or more embodiments of the invention. Following obtaining the command output (see e.g., FIG. 5C), the network device SCS agent applies the output filter expression, specified in FIG. 5B, to the command output. Recall that the output filter expression inquired whether or not the 'state' attribute, specified in the command output, rendered the MLAG service "Active" on the network device. Based on the information portrayed by the example command output, it is determined that the 'state' attribute does declare the MLAG service "Active", therefore the corresponding filter expression result (FER) (544) renders the logical criterion (e.g., output filter expression) TRUE. The network device SCS agent encapsulates the FER into the example command result (542) data structure.

Figure 5E:
FIG. 5E shows an example command response in accordance with one or more embodiments of the invention.

FIG. 5E shows an example command response in accordance with one or more embodiments of the invention. The network device SCS agent generates the (example) command response (CMR) (546) following generation of the command result. Having obtained just a single FER, the example CMR becomes substantially simplified; therefore, the example CMR reflects the TRUE result obtained from applying the output filter expression onto the command output. Subsequently, the currently generated CMR (e.g., example CMR) is examined in order to determine if at least one difference is noted between it and the previously recorded CMR. In the instance example, the example CMR yields a different result than the previously recorded CMR. Consequently, the network device SCS agent shares the example CMR with the coordination point, by writing the example CMR (as state change) in the network device state database. Accordingly, via the asynchronous replication mechanism, the network device state database is updated, and a copy of the example CMR is pushed to the coordination point state database.

Back to the network device, at this point, the network device SCS agent, upon sharing the example CMR with the coordination point, addresses the recurrence aspect of the modified CRQ. As mentioned above, the RFI of the modified CRQ obliges the network device SCS agent to register the modified CRQ as a recurring activity, with the process scheduler (not shown). Further, registration specifies, in accordance with the recurrence period provided, that the modified CRQ be re-processed every 120 seconds. In view of this, every time the recurrence period elapses, the process scheduler issues and sends a scheduled task notification to the network device SCS agent, waking and further instructing the network device SCS agent to re-process the modified CRQ.

Upon receiving the copy of the example CMR, a state change is detected, and the coordination point state database, knowing that the coordination point SCS agent registered interest in the state change, issues and provides a state change notification to the coordination point SCS agent accordingly. Eventually, the coordination point SCS agent receives a state change notification corresponding to each state change (e.g., example CMR) produced by the sharing of information by each of the identified network devices.

Figure 5F:
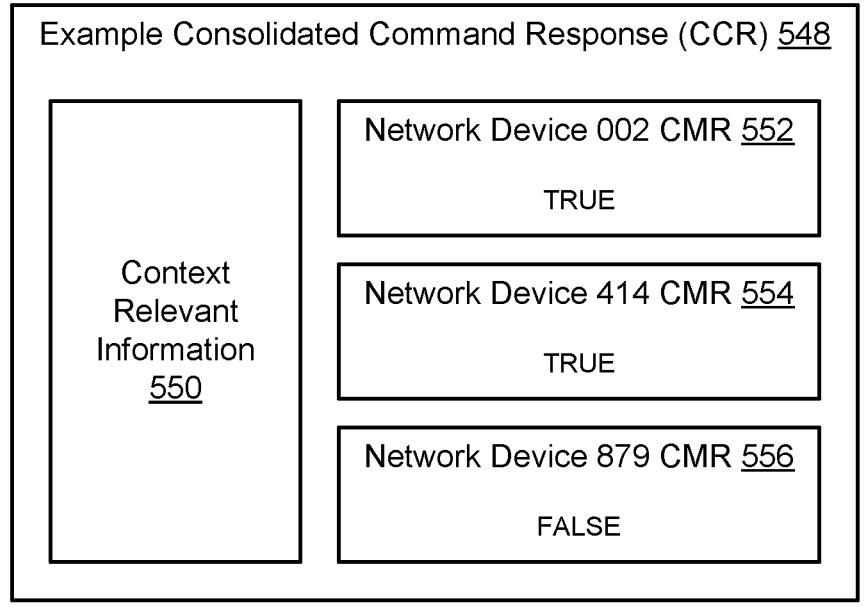
FIG. 5F shows an example consolidated command response in accordance with one or more embodiments of the invention.

FIG. 5F shows an example consolidated command response in accordance with one or more embodiments of the invention. Without an extra output filter set, the coordination point SCS agent omits further processing of the received CMRs, separately or in combination. Prior to providing results of the example CRQ to the network administrator, the example consolidated command response (CCR) (548) is generated to encapsulate and organize the information of the three CMRs, received from the three identified network devices. In the instant example CCR, the responses (552, 554, 555) from each identified network device are provided to the network operator, along with context relevant information (550) that the responses correspond to the output filter expression and relay command, respectively, specified in the CRQ received from the network operator.

As another example set in the system of FIG. 5A, consider another command request (CRQ) (not shown) is transmitted, by the network operator (504), to the coordination point SCS agent on the coordination point (502). The CRQ includes another set of network device identifiers (not shown) corresponding to network devices 088, 211, and 777. Additionally, the CRQ includes a "show ip route" command representative of a relay command, an output filter set including three output filter expressions (discussed below), and an RFI specifying the request is to be executed one time.

Upon receiving the CRQ, the coordination point SCS agent first identifies, using the enclosed network device identifiers, the network devices (e.g., network devices 088, 211, and 777) to which the request is directed. As discussed above, after modifying the CRQ to obtain a modified CRQ, the coordination point SCS agent forwards the modified CRQ to its counterpart on each of the identified network devices (e.g., the network device SCS agent) by writing the modified CRQ into the coordination point state database on the coordination point. At each of the identified network devices, a corresponding network device SCS agent obtains the modified CRQ (from a network device state database) and proceeds to process the modified CRQ.

Given the "show ip route" command, upon execution by relay command executor (RCE), a command output, displaying table entries (e.g., static routes, routes to directly connected networks, dynamically learned routes, etc.) in the forward information base (FIB) of the network device, results. From here, the network device SCS agent applies the three aforementioned output filter expressions onto the resulting command output. In the present example, suppose the first output filter expression returns a logical true or false depending on whether routing is active (e.g., whether there are any routes) at all on a network device. In the case that a logical true was returned because routes were found on the network device, then subsequently, suppose the second output filter expression counts and returns the number of network prefixes amongst the active routes. Finally, a third output filter expression is applied, returning a logical true granted any of the network prefixes matched a specified set of RFC-1918 private network addresses (e.g., 10/8, 172.16/12, or 192.168/16). Consequent to the cascade of output filter expressions applied, a command result and further, a command response (CMR) is obtained.

At this point, each network device SCS agent on each of the identified network devices, shares their respective command responses with the coordination point. Further, because the RFI included in the modified CRQ specified that the request be executed only once, the network device SCS agent does not involve the process scheduler with regards to this request. At the coordination point, the coordination point state database obtains the three command responses from the three network devices identified within the original command request (CRQ). As a result of obtaining the three command responses, a state change is detected, and a state change notification is forwarded to the coordination point SCS agent.

Figure 6:
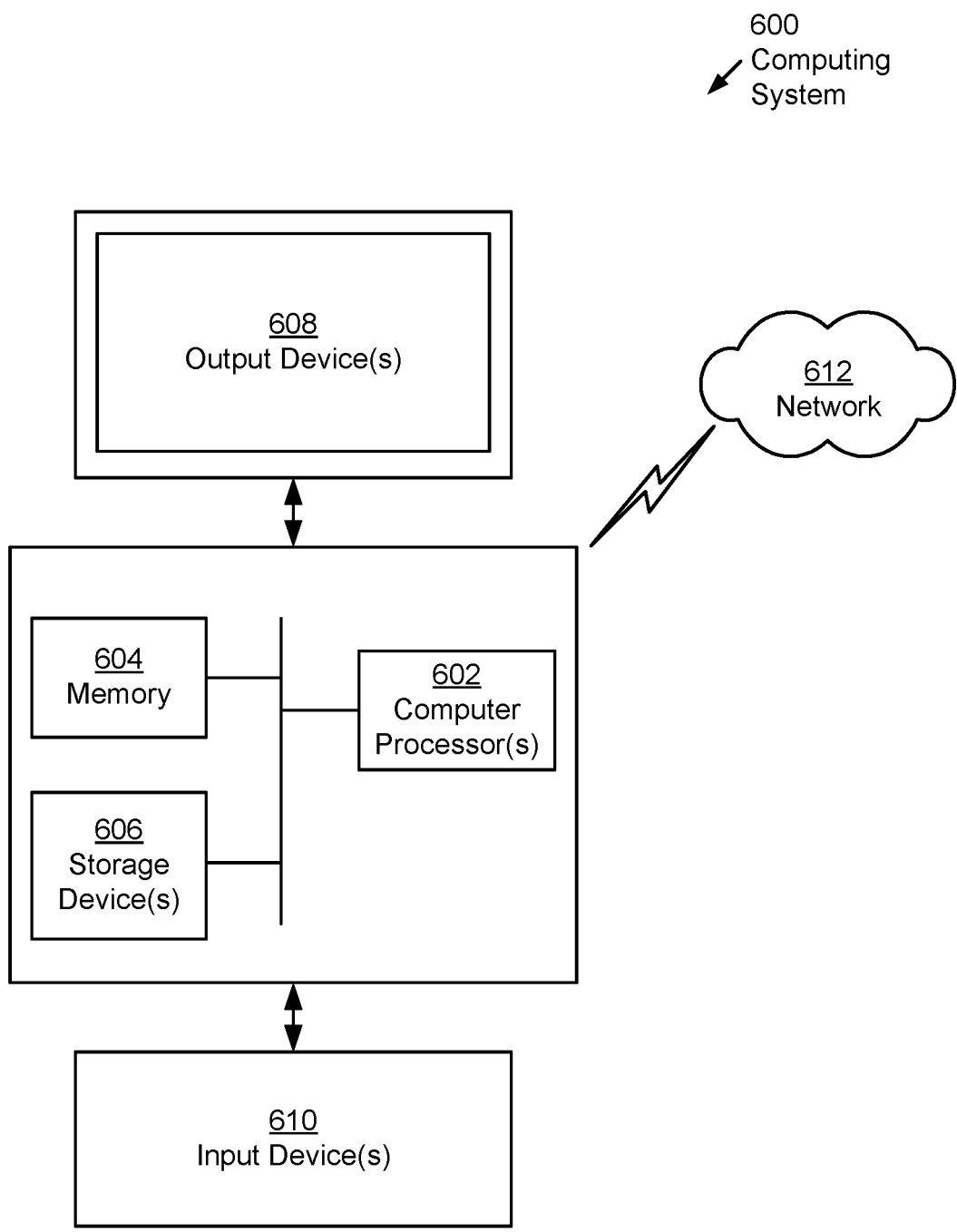
FIG. 6 shows a computing system in accordance with one or more embodiments of the invention.

Embodiments of the invention may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable medium program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, on or more elements of the computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a command request (CRQ) to obtain a consolidated command response (CMR), comprising:
   receiving an event notification from a notification issuer;
   obtaining, in response to the received event notification, a modified command request (MCRQ) based on the CRQ from a network device state database, the MCRQ comprising a relay command and an output filter set, wherein the output filter set comprises fewer output filter expressions than the CRQ;
   executing, by a network device, the relay command to obtain a command output, wherein the command output comprises state information of the network device;
   making a first determination that the output filter set is not an empty set;
   based on the first determination:
      extracting an output filter expression and a second output filter expression from the output filter set;
      applying, to the command output, the output filter expression to obtain a filter expression result (FER), wherein the FER is a subset of the command output;
      applying, to the command output, the second output filter expression to obtain a second FER, wherein the second FER is a second subset of the command output, wherein the second subset of the command output is different than the subset of the command output;
   generating the CMR based on the FER and the second FER;
   making a second determination that the CMR includes a difference from a previously generated CMR; and
   sharing, based on the second determination, the CMR with a coordination point.

2. The method of claim 1, further comprising:
   making a third determination that the MCRQ is a recurring activity;

identifying, based on the third determination, a recurrence period; and registering the MCRQ with a process scheduler based on the recurrence period.

3. The method of claim 2, wherein the recurrence period specifies a time interval for periodically processing the MCRQ.

4. The method of claim 1, wherein the MCRQ further comprises a request frequency information (RFI) and wherein the RFI comprises information specifying the MCRQ as one selected from a group consisting of a one-time activity and a recurring activity.

5. The method of claim 4, wherein the RFI further comprises a recurrence period.

6. The method of claim 1, wherein the event notification is one selected from a group consisting of a state change notification and a scheduled task notification.

7. The method of claim 1, further comprising:
processing the CMR using an extra filter to obtain a portion of the consolidated CMR,
wherein the CRQ comprises the extra filter,
wherein the MCRQ does not include the extra filter.

8. The method of claim 1, wherein sharing the CMR with the coordination point comprises writing the CMR into the network device state database.

9. The method of claim 1, wherein the network device is a network switch.

10. The method of claim 1, wherein the state information for the network device comprises control plane state information associated with a control plane of the network device.

11. The method of claim 1, wherein the state information for the network device comprises data plane state information associated with a data plane of the network device.

12. The method of claim 1, wherein the relay command comprises a show command.

13. The method of claim 1, wherein the MCRQ is stored in the network device state database on the network device.

14. The method of claim 1, wherein the MCRQ is re-evaluated periodically.

15. A network device, comprising:
a computer processor;
a network device state database accessible to a network device show command service (SCS) agent;
memory comprising computer instructions, which when executed by the computer processor, enable the network device to:
receive an event notification from a notification issuer;
obtain, in response to the received event notification, a modified command request (MCRQ) based on a CRQ from the network device state database, the MCRQ comprising a relay command and an output filter set, wherein the output filter set comprises fewer output filter expressions than the CRQ;
execute the relay command to obtain a command output, wherein the command output comprises state information of the network device;
make a first determination that the output filter set is not an empty set;
based on the first determination:
extract an output filter expression and a second output filter expression from the output filter set;
apply, to the command output, the output filter expression to obtain a filter expression result (FER), wherein the FER is a subset of the command output;
apply, to the command output, the second output filter expression to obtain a second FER, wherein the second FER is a second subset of the command output, wherein the second subset of the command output is different than the subset of the command output:
generate a CMR based on the FER and the second FER;
make a second determination that the CMR includes a difference from a previously generated CMR; and
share, based on the second determination, the CMR with a coordination point.

16. The network device of claim 15, wherein the network device SCS agent is further configured to:
make a third determination that the MCRQ is a recurring activity;
identify, based on the second determination, a recurrence period; and
register the MCRQ with a process scheduler based on the recurrence period.

17. A non-transitory computer readable medium comprising instructions, which when executed by a processor, perform a method for processing a command request (CRQ) to obtain a consolidated command response (CMR), the method comprising:
receiving an event notification from a notification issuer;
obtaining, in response to the received event notification, a modified command request (MCRQ) based on the CRQ from a network device state database, the MCRQ comprising a relay command and an output filter set, wherein the output filter set comprises fewer output filter expressions than the CRQ;
executing, by a network device, the relay command to obtain a command output, wherein the command output comprises state information of the network device;
making a first determination that the output filter set is not an empty set;
based on the first determination:
extracting an output filter expression and a second output filter expression from the output filter set;
applying, to the command output, the output filter expression to obtain a filter expression result (FER), wherein the FER is a subset of the command output;
applying, to the command output, the second output filter expression to obtain a second FER, wherein the second FER is a second subset of the command output, wherein the second subset of the command output is different than the subset of the command output;
generating the CMR based on the FER and the second FER;
making a second determination that the CMR includes a difference from a previously generated CMR; and
sharing, based on the second determination, the CMR with a coordination point.

18. The non-transitory computer readable medium of claim 17, the method further comprising:
making a third determination that the MCRQ is a recurring activity;
identifying, based on the third determination, a recurrence period; and
registering the MCRQ with a process scheduler based on the recurrence period.

* * * * *